United States Patent [19]

Kobayashi et al.

[11] Patent Number: 5,016,038

[45] Date of Patent: May 14, 1991

[54] STROBE CONTROL APPARATUS

[75] Inventors: Takeo Kobayashi, Tokyo; Takao Nishida, Urawa; Yasushi Tabata, Ichikawa; Norio Numako, Nogi; Katsutoshi Nagai, Kawaguchi, all of Japan

[73] Assignee: Asahi Kogaku Kogyo Kabushiki Kaisha, Tokyo, Japan

[21] Appl. No.: 494,237

[22] Filed: Mar. 15, 1990

[51] Int. Cl.$^5$ .................. G03B 7/16; G03B 15/03; G03B 00/00

[52] U.S. Cl. .................. 354/418; 354/127.11; 354/145.1

[58] Field of Search ............ 354/145.1, 418, 127.11, 354/127.12, 420, 421, 422, 423

[56] References Cited

U.S. PATENT DOCUMENTS

| | | | |
|---|---|---|---|
| 4,153,355 | 5/1979 | Ikawa et al. | 354/145.11 X |
| 4,924,149 | 5/1990 | Nishida et al. | 354/127.11 |
| 4,924,251 | 5/1990 | Ishimura et al. | 354/418 |

Primary Examiner—L. T. Hix
Assistant Examiner—Jae N. Noh
Attorney, Agent, or Firm—Sandler, Greenblum & Bernstein

[57] ABSTRACT

An apparatus for controlling a strobe which is used in a camera. The strobe control apparatus includes a charging time-limit selecting device for selecting one of plurality of charging times according to the operating conditions of the camera, and a charging voltage limit selecting device for selecting one of plurality of charge limit voltages according to the operating conditions of the camera. If the charged voltage of the strobe does not reach the selected charge limit voltage after the selected charging time has elapsed, charging is stopped. The strobe control apparatus also includes a charge prohibiting device for prohibiting charging if a predetermined charge prohibit time has not elapsed after charging is completed, so as to prevent damage to the strobe due to heat generated by frequent flashings. The predetermined prohibit time is changed, however, according to the sensed heat condition of the strobe.

16 Claims, 42 Drawing Sheets

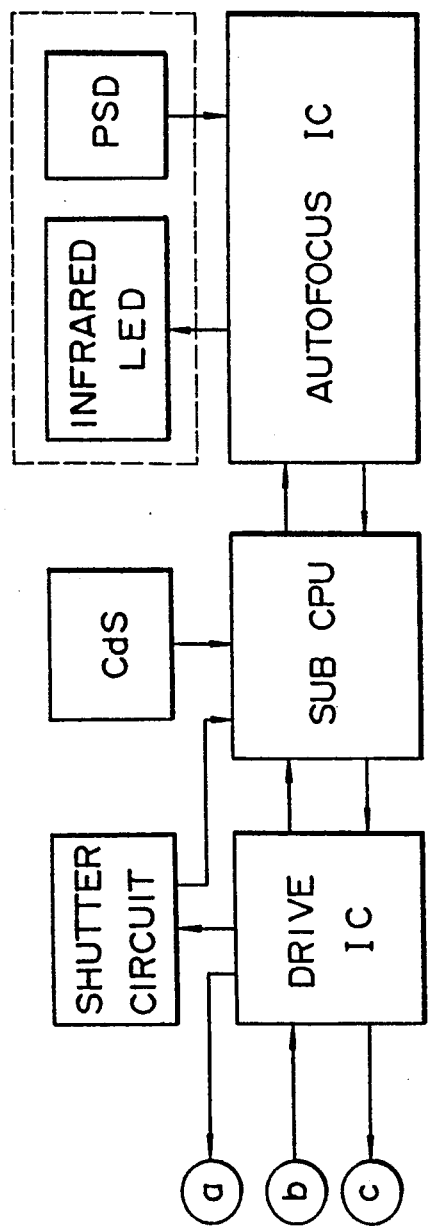
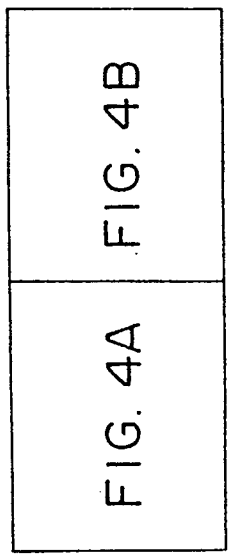

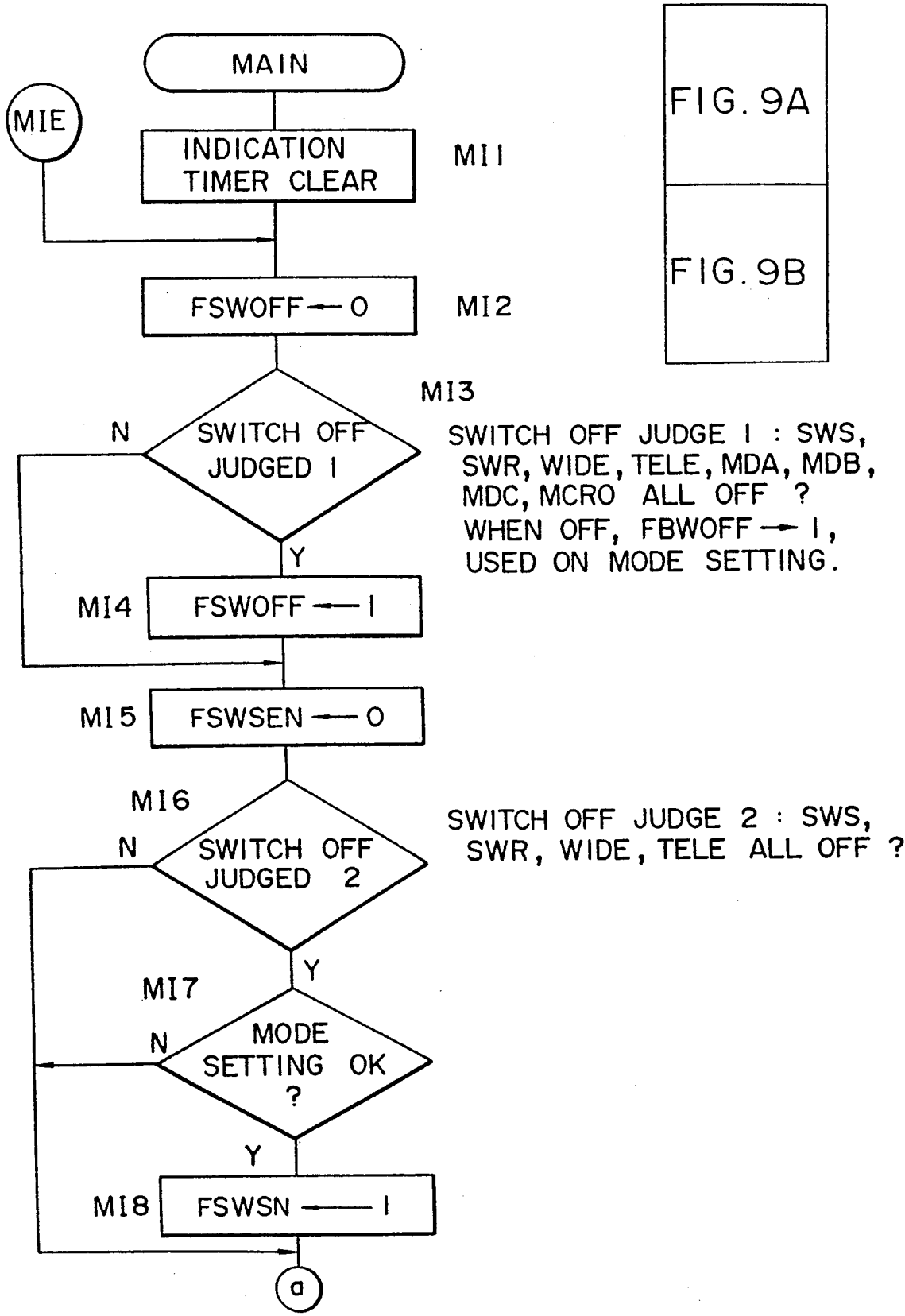

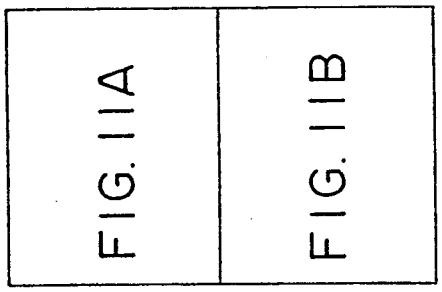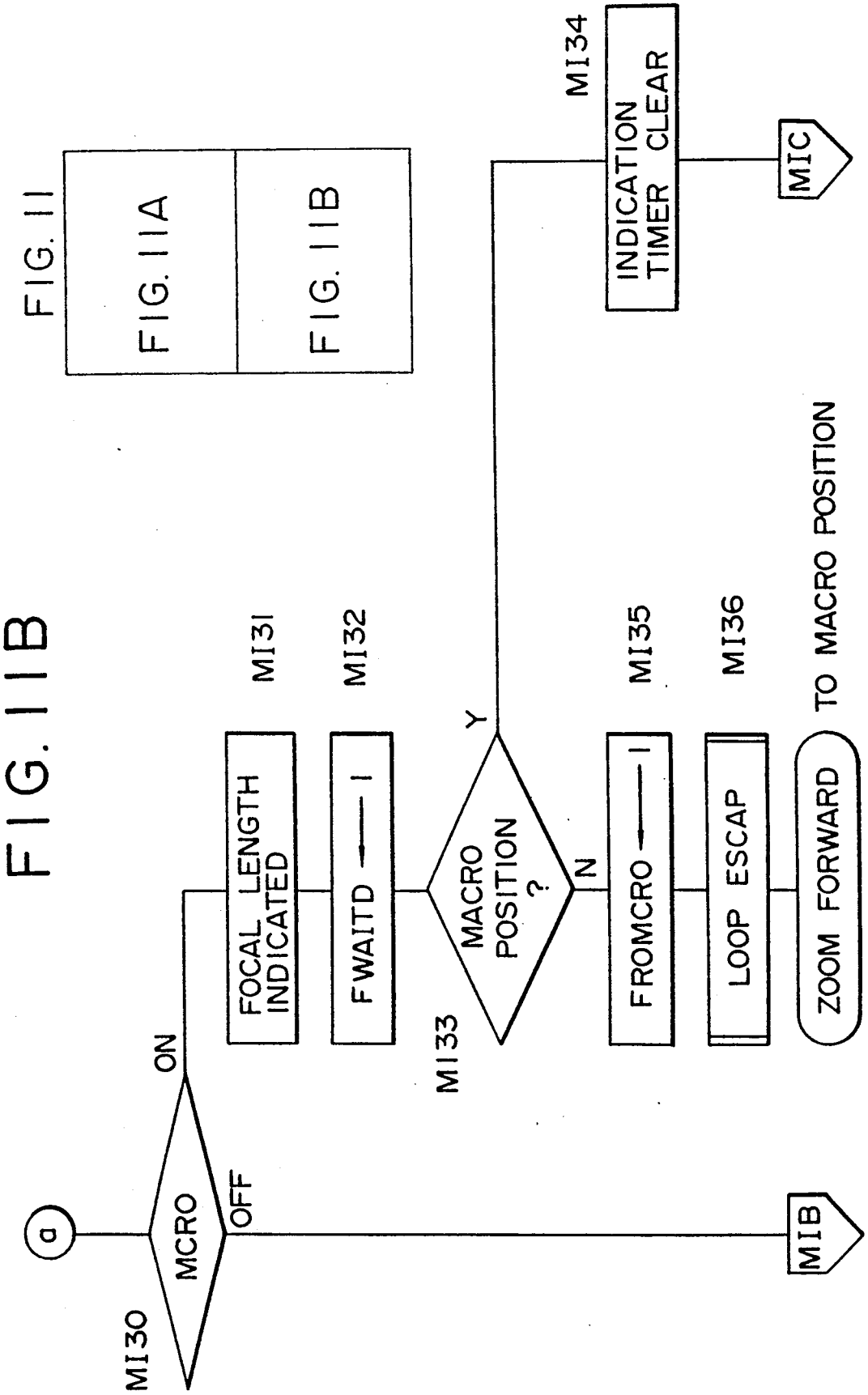

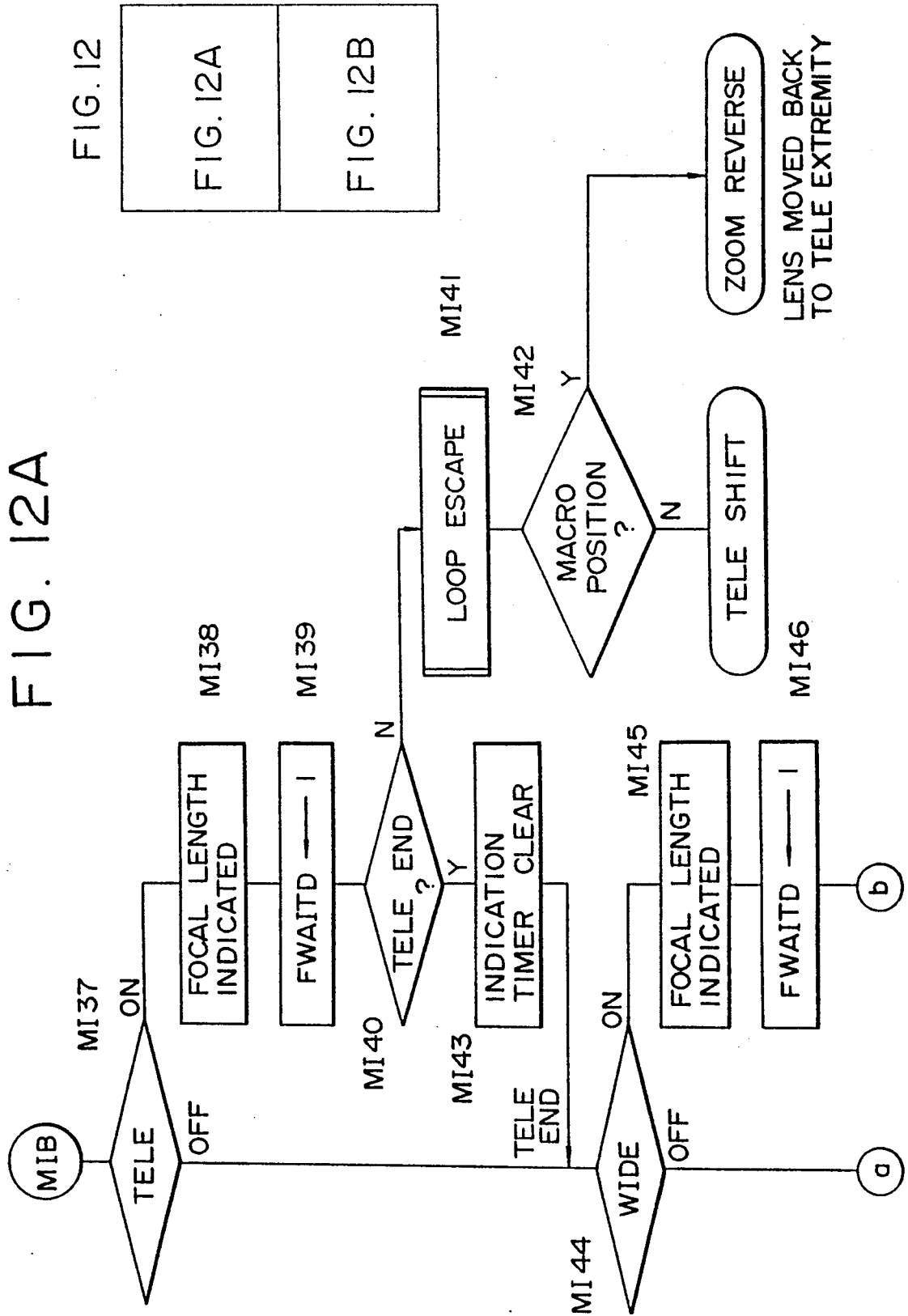

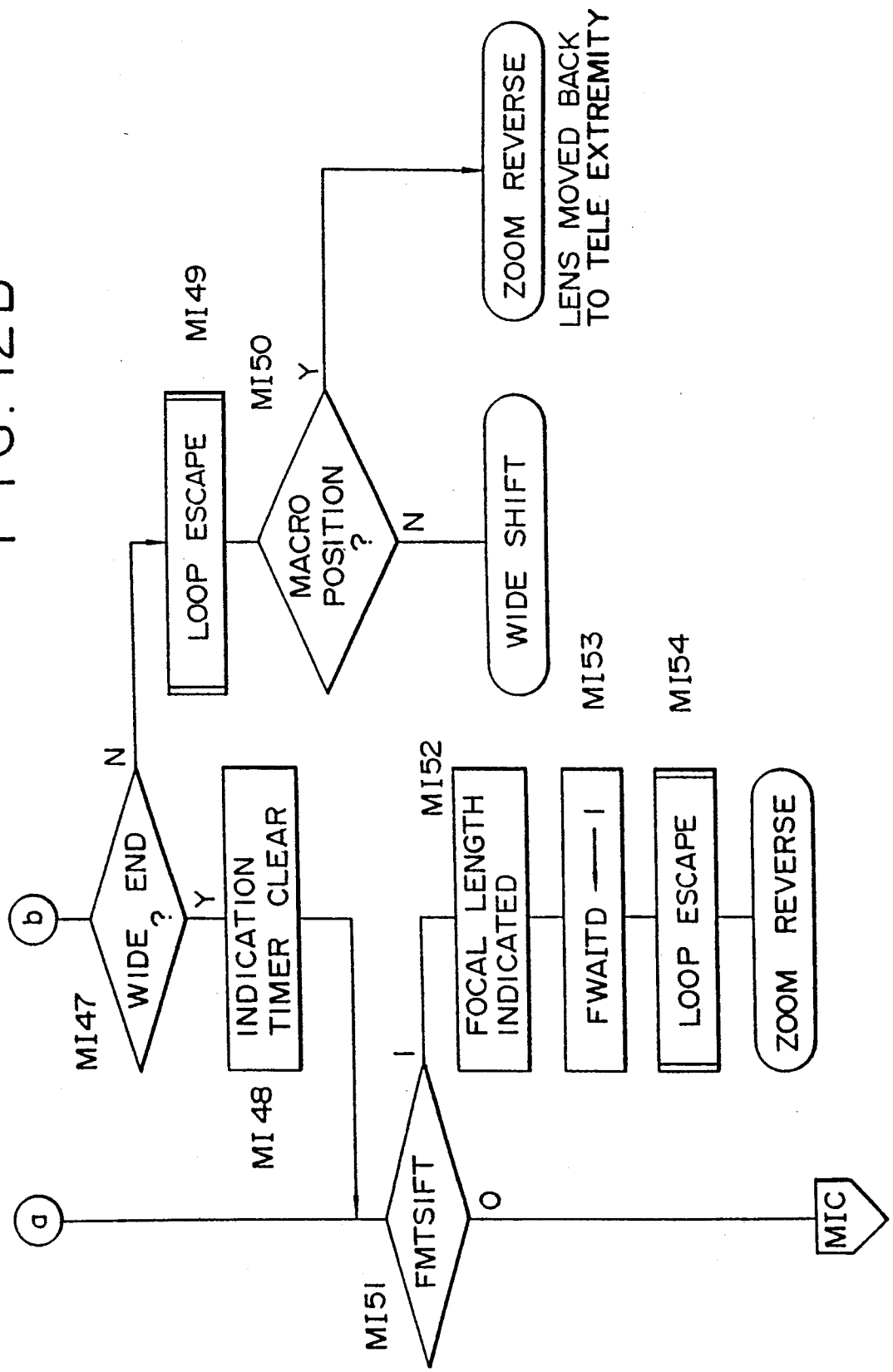

| FIG. 13A |
| FIG. 13B |

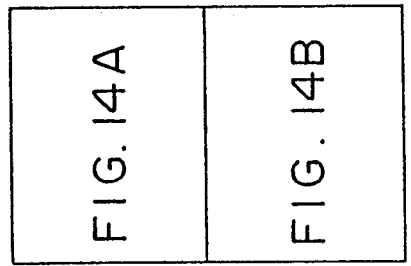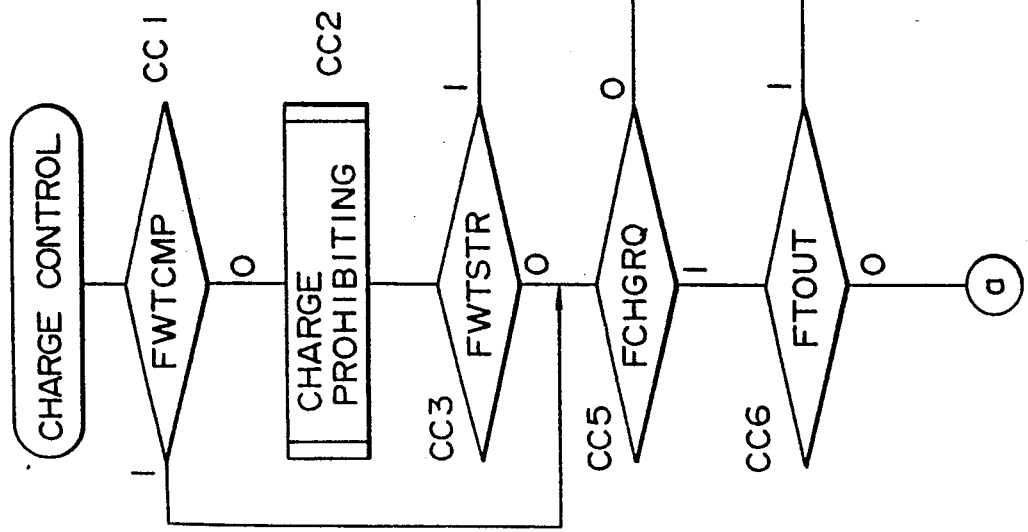

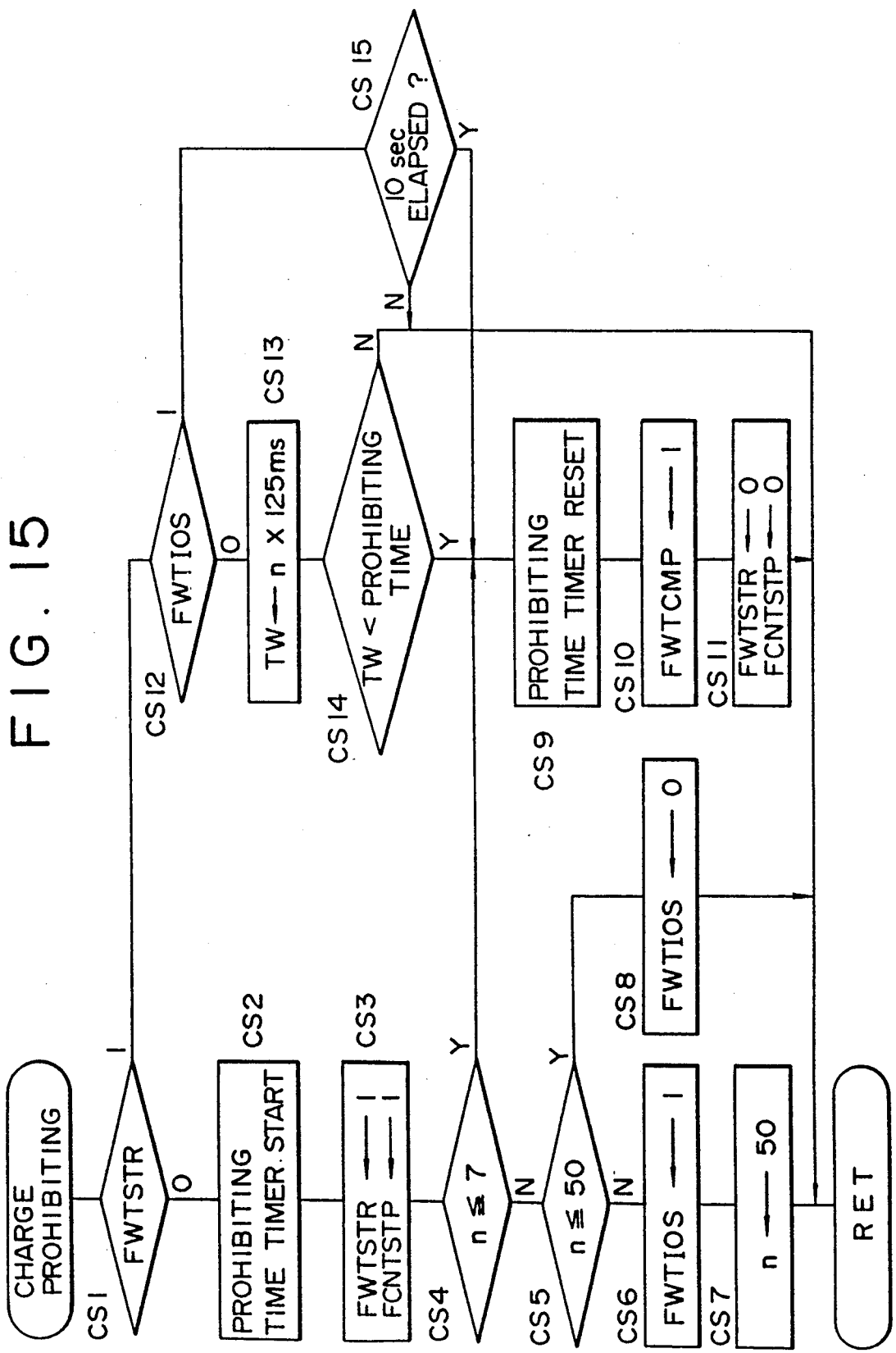

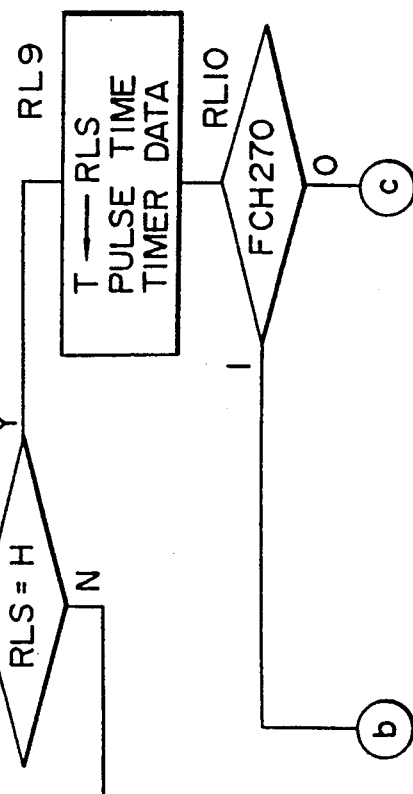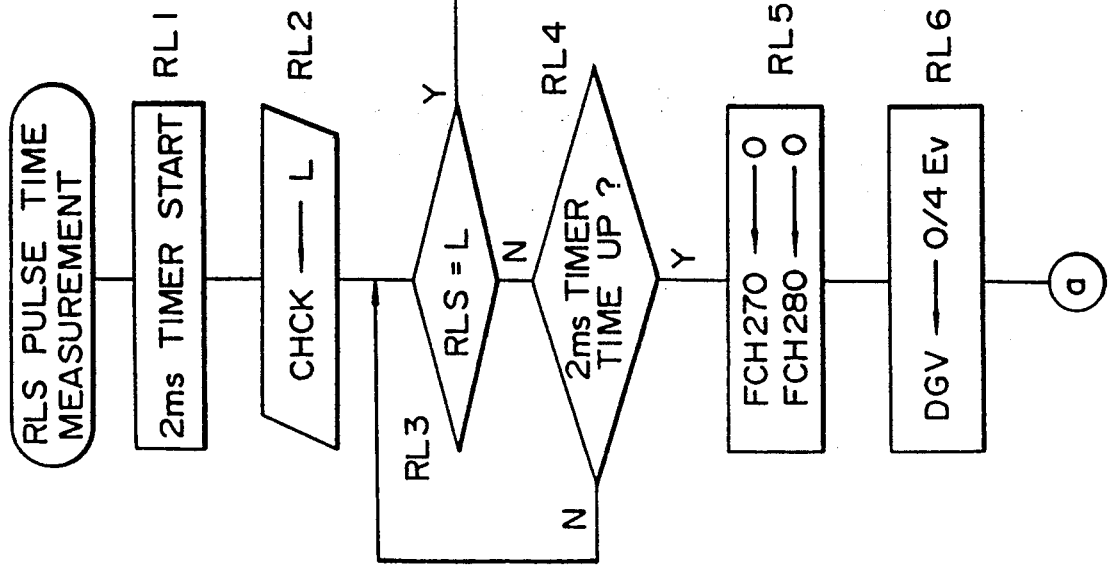
FIG. 16A

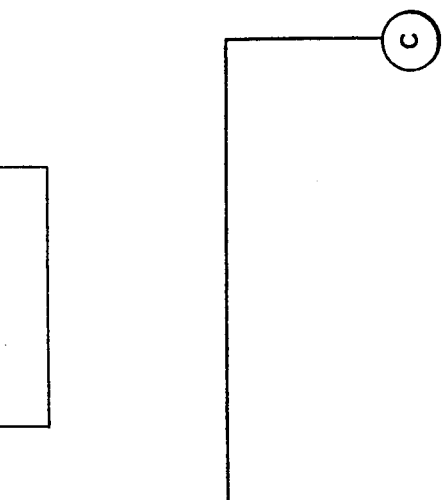
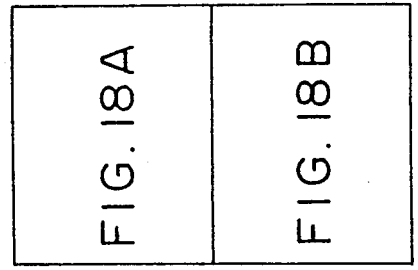
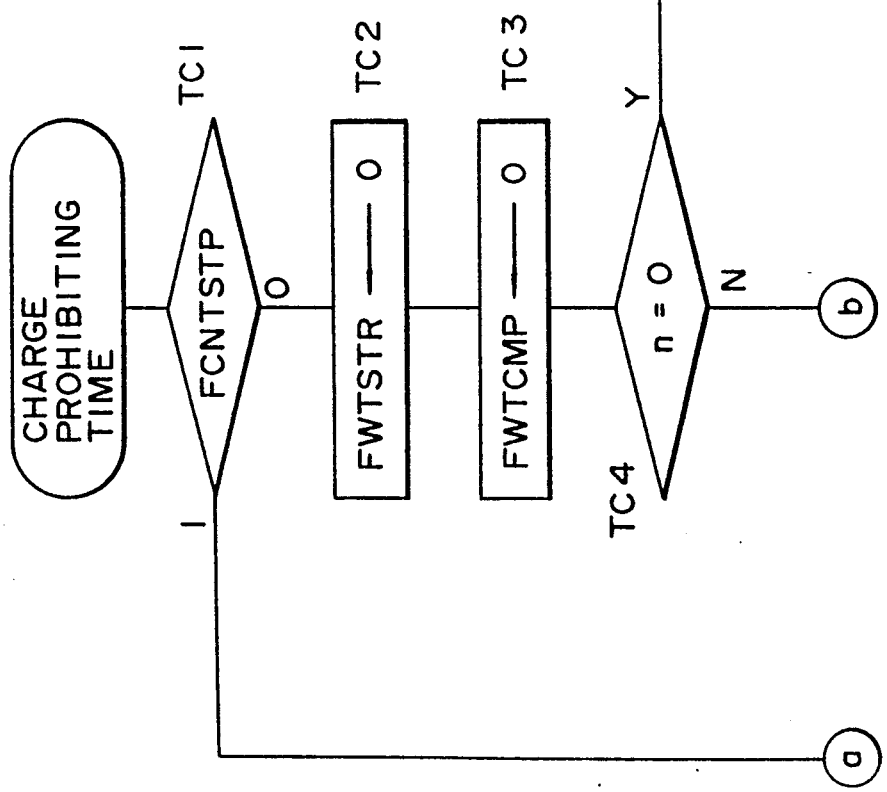

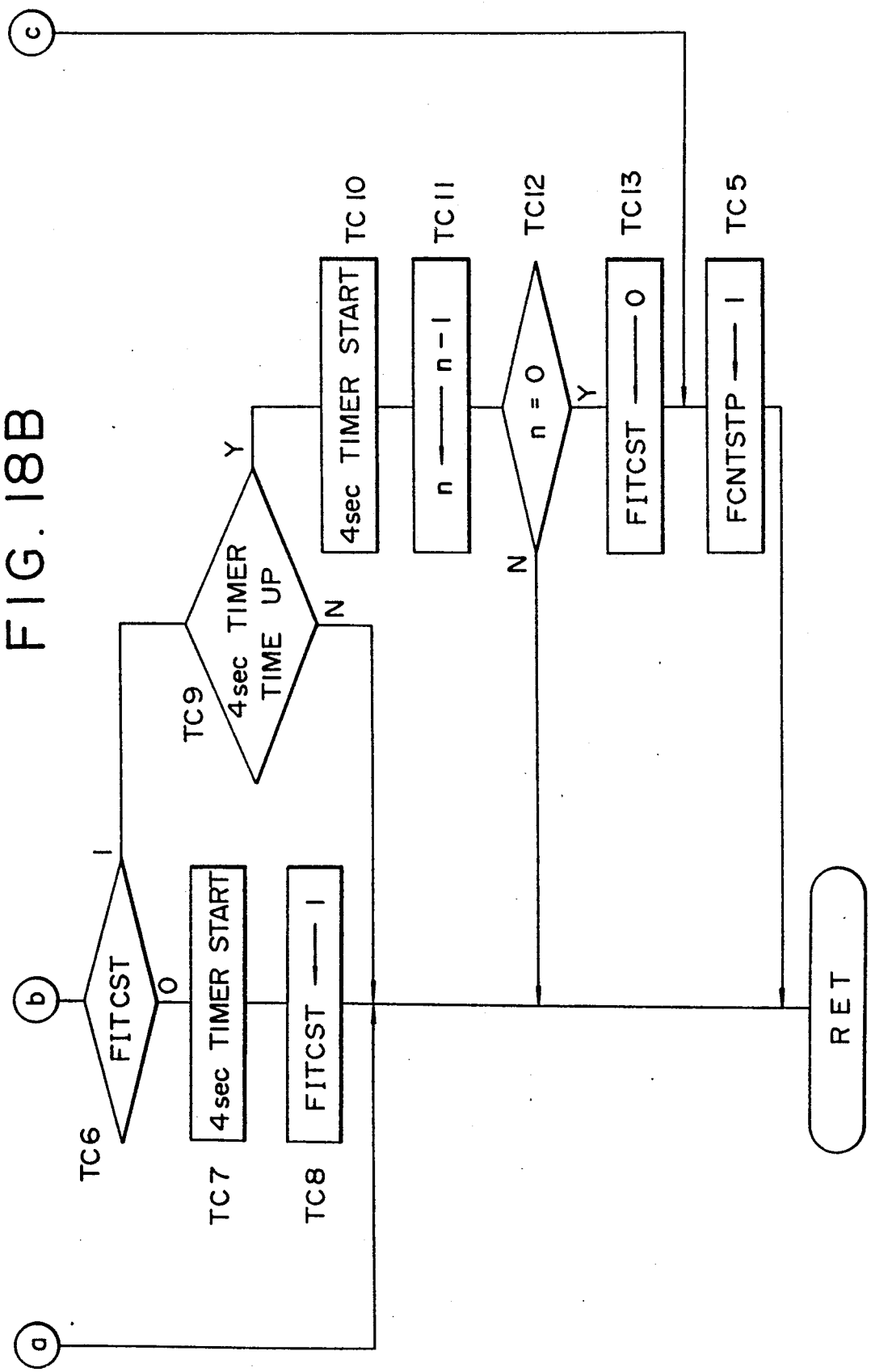

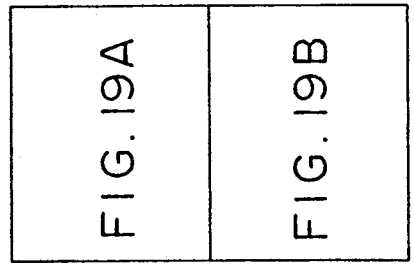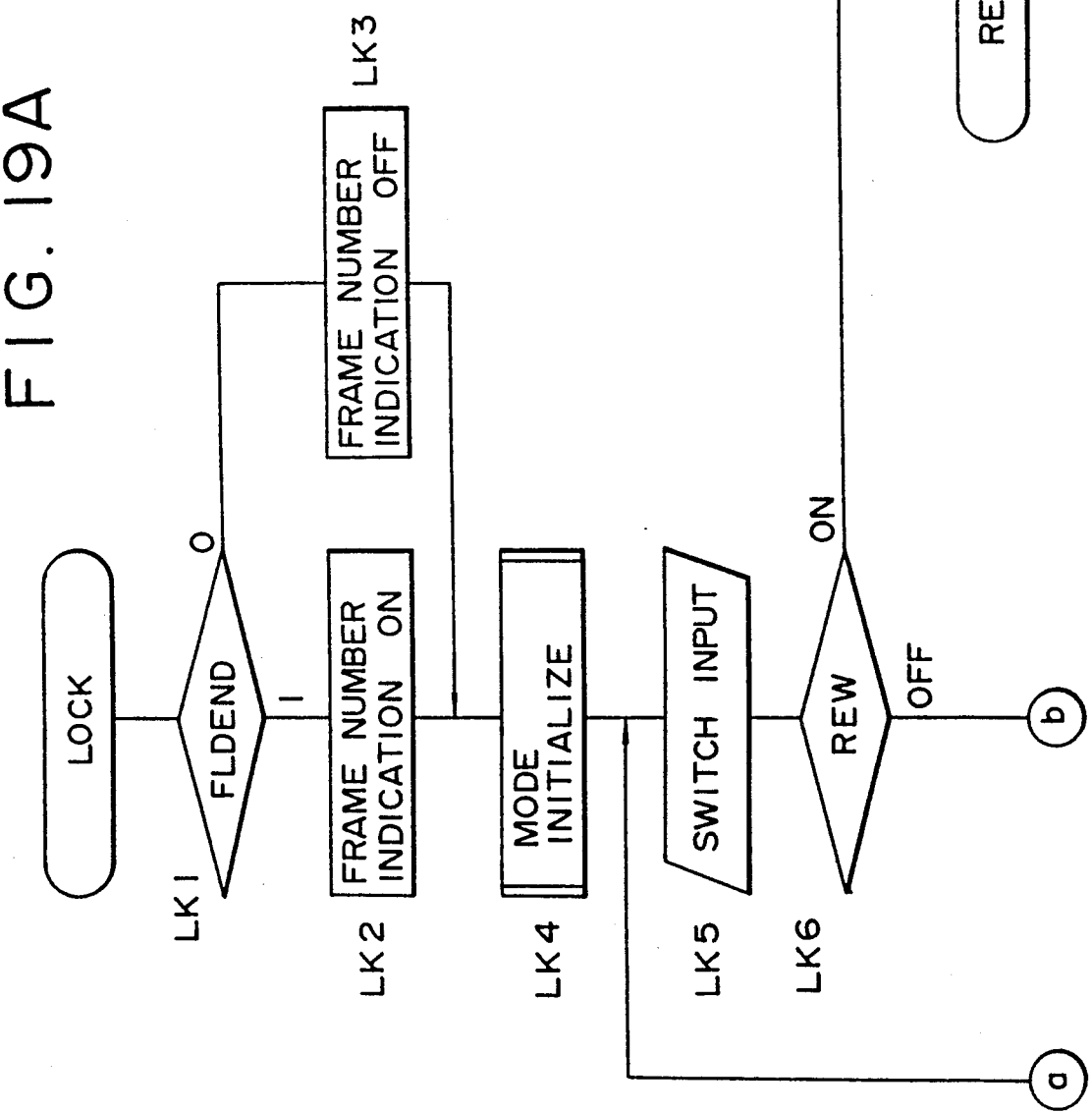
FIG. 19A

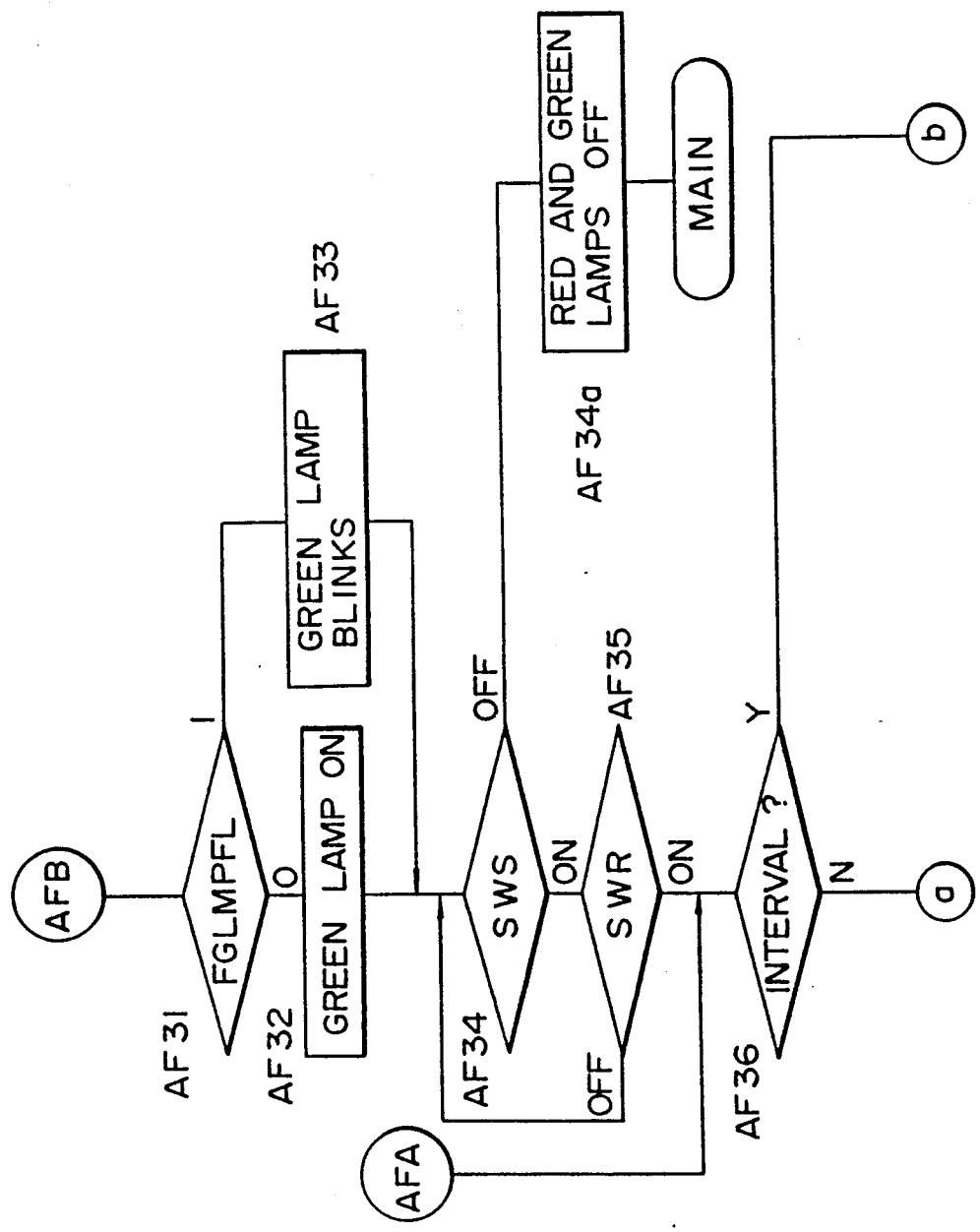

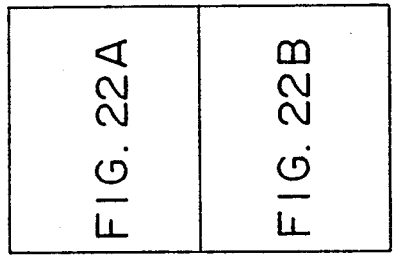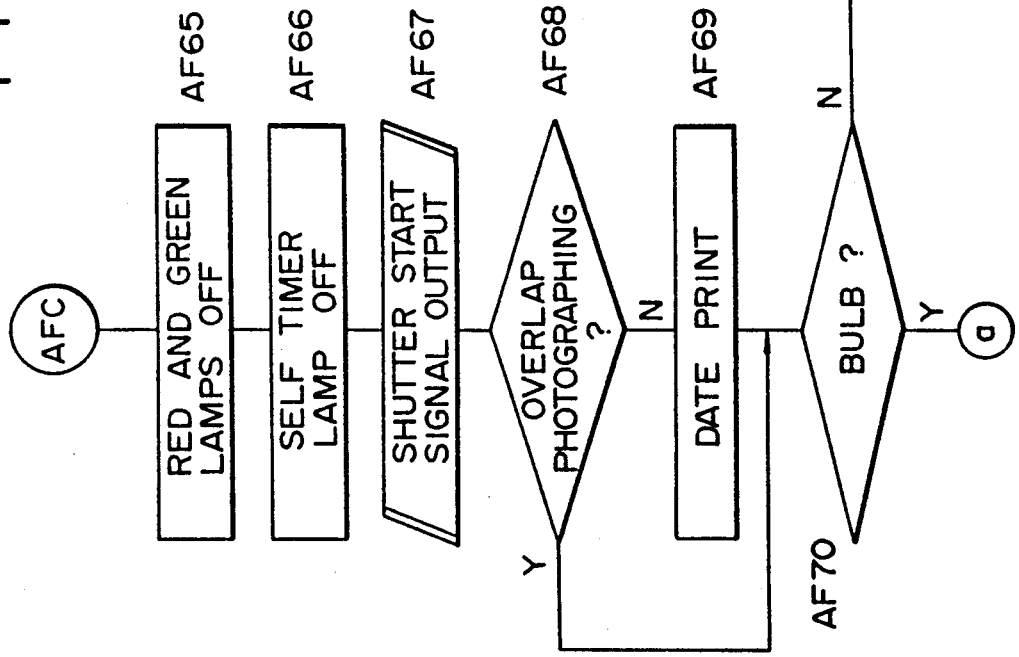

FIG. 24A
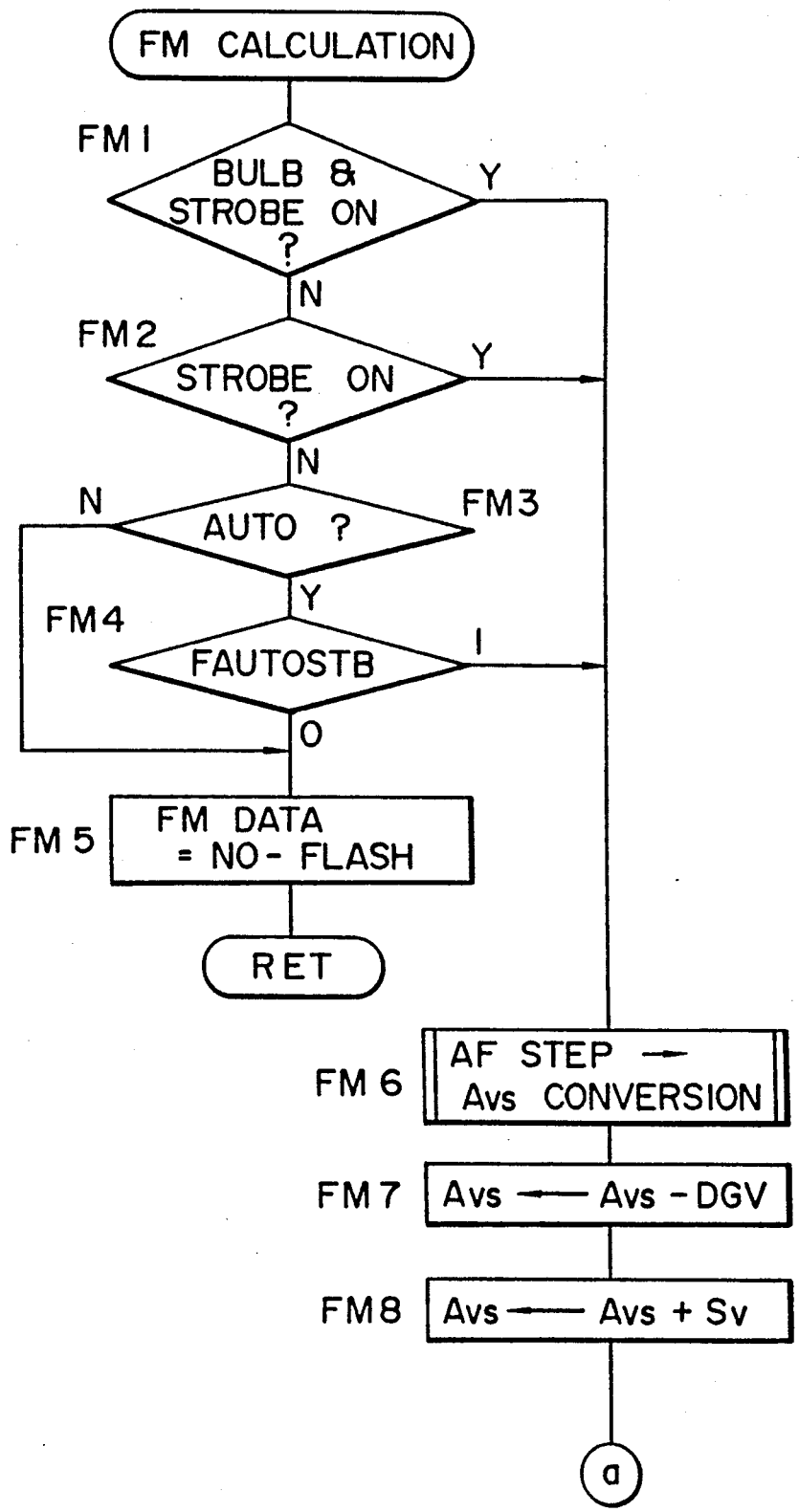
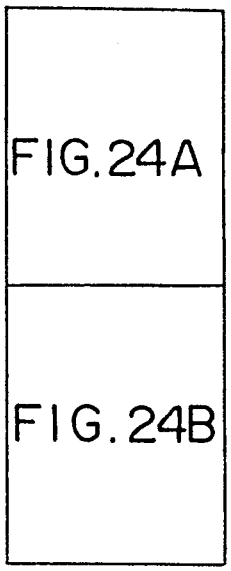

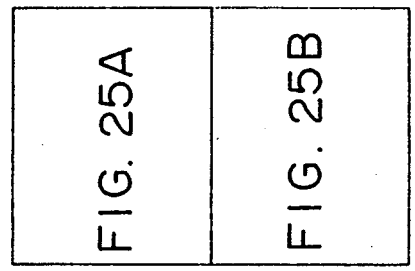
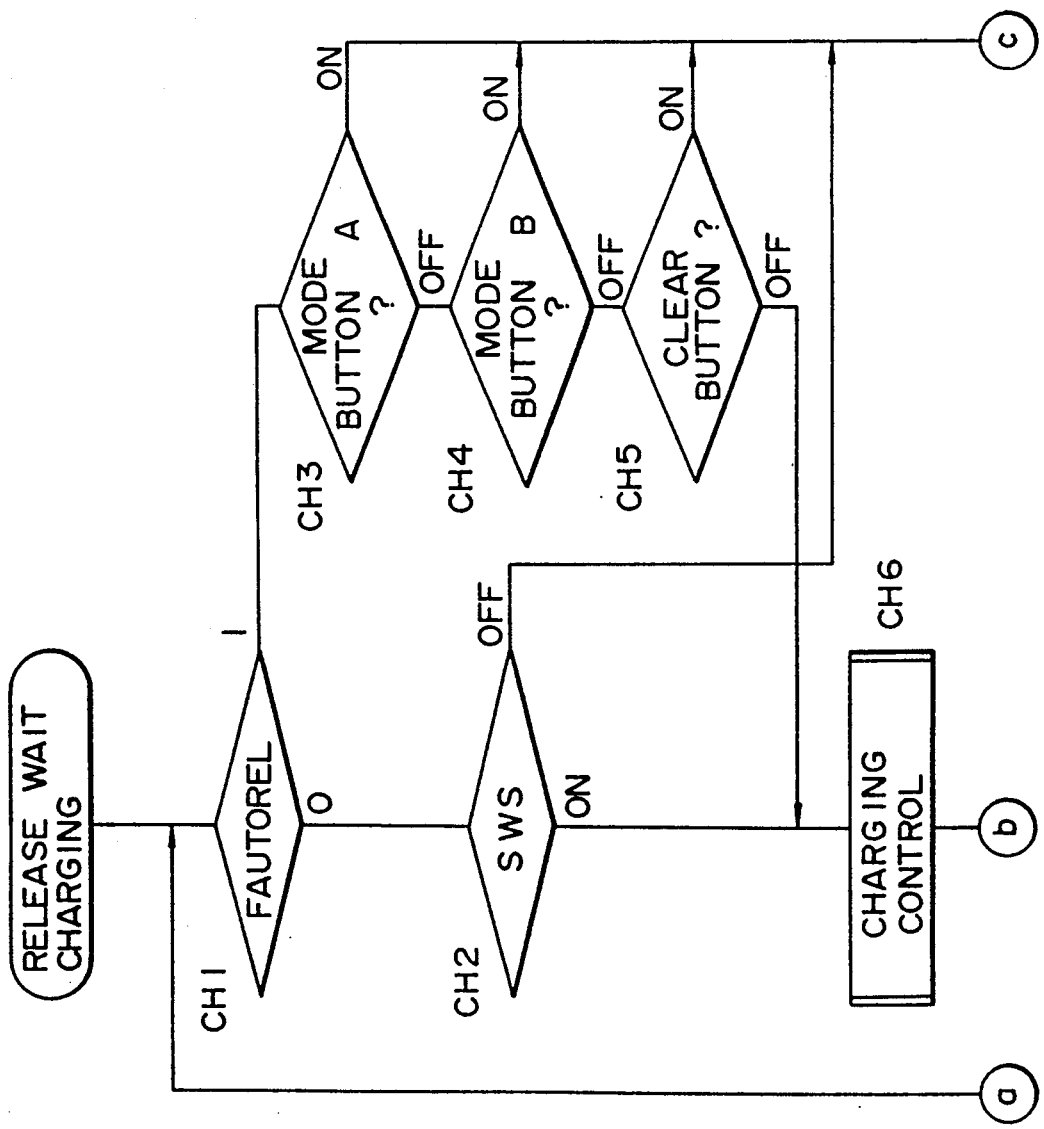

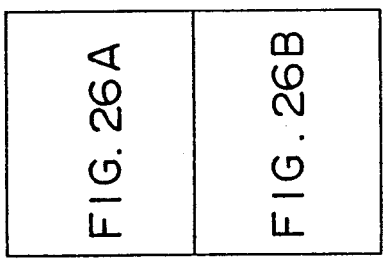
FIG. 26B
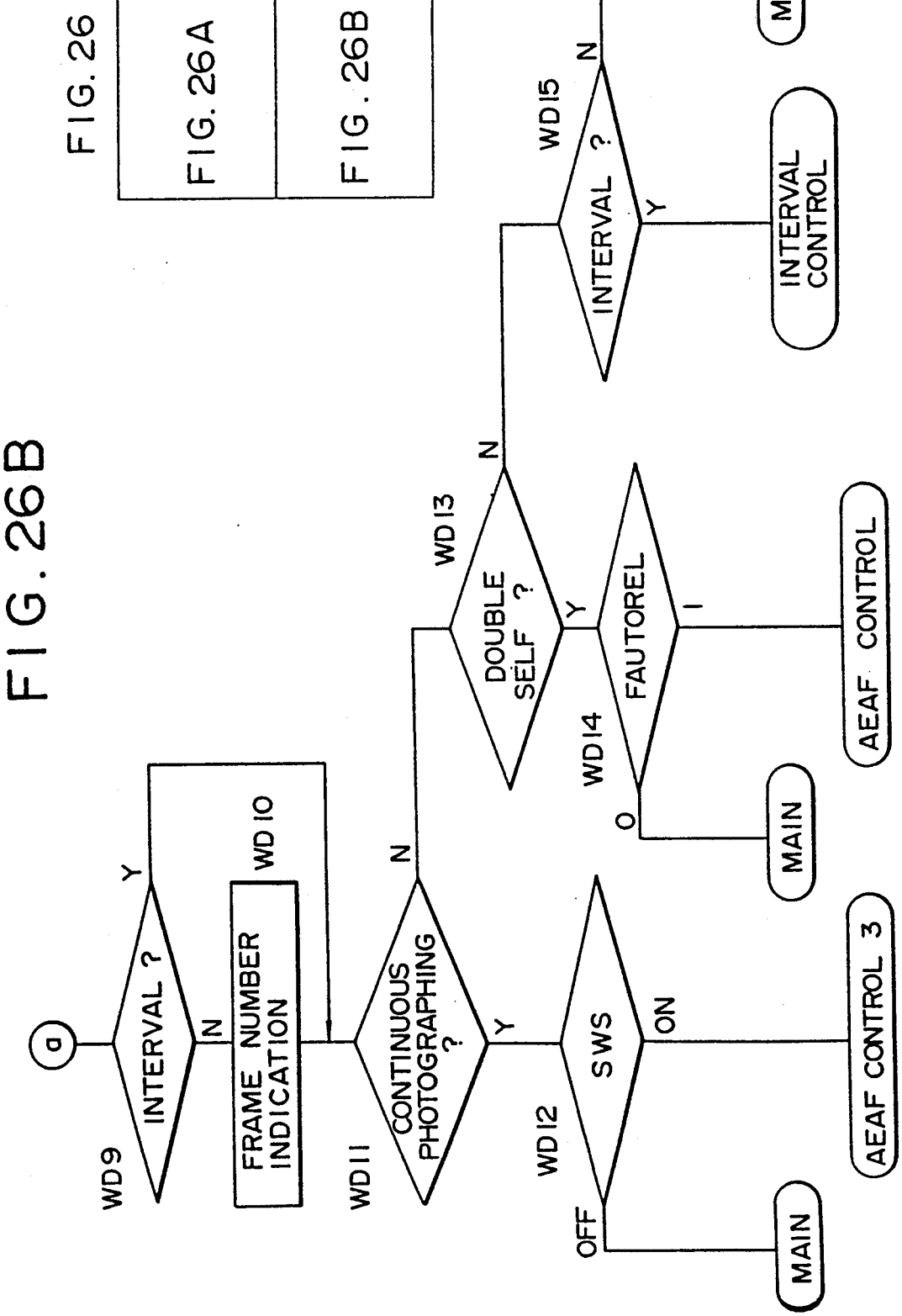

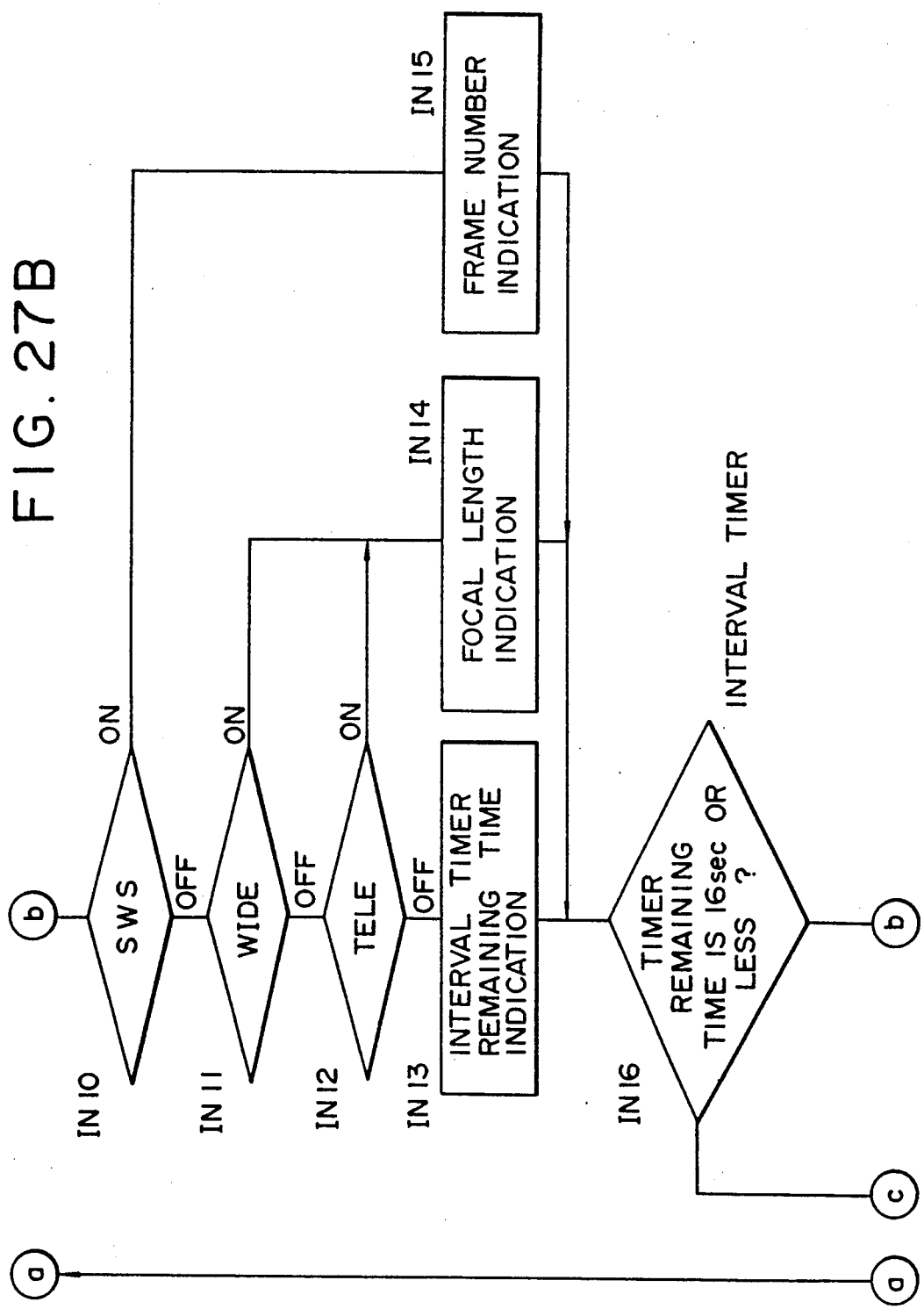

STROBE CONTROL APPARATUS

BACKGROUND OF THE INVENTION

The present invention relates to a strobe control apparatus for controlling a strobe used in a camera.

Conventionally, it is necessary to check whether the charged voltage of a main capacitor in a strobe circuit reaches a predetermined level, and in accordance to which flash permission or an indication thereof is given.

In case the above predetermined level is the only voltage level, strobe flashing cannot be accurately controlled according to the present voltage charge.

On the other hand, in case a plurality of voltage levels are available, it can become necessary to employ as arrangements such as to divide the charged voltage, to A/D convert and to check whether the charged voltage has reached each level.

Thereby, the circuit size becomes large and the circuit becomes complicated and large-sized, resulting in higher costs.

Furthermore, as the amount of current which flows in a camera has recently increased since the performance of the batteries used therein has improved, there is a tendency for the charging time of a strobe to become shortened. Thus, the strobes can be flashed frequently and thereby the amount of heat generated due to charging also increases.

If the circuit is heated with the heat generated from charging the paraffin which secured the winding of a boosting transformer may melt and thereby the circuit may be damaged. In addition, the winding itself or the transistors thereof may also be damaged by heat.

To prevent the circuits from being heated, large capacity transistors or large capacity transformers can be effectively used. However, in small cameras such as lens shutter type cameras, the circuits should be compactly structured. Thus, it is preferable not to use large capacity transistors and transformers.

SUMMARY OF THE INVENTION

It is therefore an object of the present invention is to provide a strobe control apparatus capable of detecting charged voltage in a plurality of levels with a simple structure.

Another object of the present invention is to provide a strobe control apparatus capable of allowing the circuits to be compactly structured while preventing the transformers and transistors from being thermally damaged.

For the above purposes, according to the invention, there is provided a strobe charge control apparatus for controlling a strobe, which comprises a charger for charging the strobe and a voltage detecting mechanism for detecting the charged voltage of the strobe;

the charging time measuring mechanism for measuring the time elapsed after charging starts and a charging time-limit selection mechanism for selecting one of plurality of a charging times according to the operation conditions of a camera are also provided.

A charging voltage limit selection mechanism for selecting one of plurality of charge limit voltages according to the operation conditions of a camera, and a charge stop mechanism for stopping charging when the charged voltage does not reach the selected charge limit voltage after the selected charging time has elapsed.

A charge prohibit mechanism for prohibiting charging if a predetermined charge prohibit time has not elapsed after charging is once completed and a heat descriminating mechanism for descriminating the heat condition of the strobe; and a prohibit time change mechanism for changing said predetermined prohibit time according to the heat condition of said strobe descriminated by said heat descriminating means.

According to another aspect of the invention, there is provided a strobe charge control apparatus for controlling a strobe, which comprises;

a charge device for charging the strobe, a voltage detecting device for detecting the charged voltage of the strobe, a charging time measuring device for measuring the time elapsed after charging starts, a charging time-limit select for selecting one of a plurality of charging times according to operation conditions of a camera are provided.

a charging voltage limit selection device for selecting one of plurality of charge limit voltages according to the operation conditions of a camera and a charge stop for stopping blue charging when the charged voltage does not reach the selected charge limit voltage after the selected charging time has elapsed are also provided.

According to further aspect of the invention, there is provided an apparatus for controlling a strobe, which comprises a charge mechanism for charging the strobe a heat descriminating mechanism for prohibiting charging if a predetermined charge prohibit time is not elapsed after charging is once completed a heat descriminating mechanism for descriminating the heat condition of the strobe; and a prohibit time change mechanism for changing the predetermined prohibit time according to the heat condition of the strobe descriminated by the heat descriminating mechanism.

DESCRIPTION OF THE ACCOMPANYING DRAWINGS

FIG. 1 is a top view; FIG. 2 is a front view; and FIG. 3 is a rear view;

FIG. 8 to FIG. 29 are flow charts showing functions of the camera which is equipped with the charging control apparatus according to the present invention.

FIG. 8 is flow chart showing a reset processing;

FIGS. 9, 11, 12 and 13 are flow charts showing main processing;

FIG. 10 is a flow chart showing loop exit processing;

FIG. 14 is a flow chart showing a charging control processing (including stop processing);

FIG. 15 is a flow chart showing charging prohibition processing;

FIG. 16 is a flow chart showing RLS pulse time measurement processing;

FIG. 17 is a flow chart showing time out check processing;

FIG. 18 is a flow chart showing charging prohibition time processing;

FIG. 19 is a flow chart showing lock processing;

FIGS. 20, 21 and 22 are flow charts showing AEAF control processing;

FIG. 23 is a flow chart showing voltage check processing;

FIG. 24 is a flow chart showing FM calculation processing;

FIG. 25 is a flow chart showing release wait charging processing;

FIG. 26 is a flow chart showing film winding processing; and

FIG. 27 is a flow chart showing an interval control processing.

DESCRIPTION OF THE EMBODIMENTS

Figure 1:
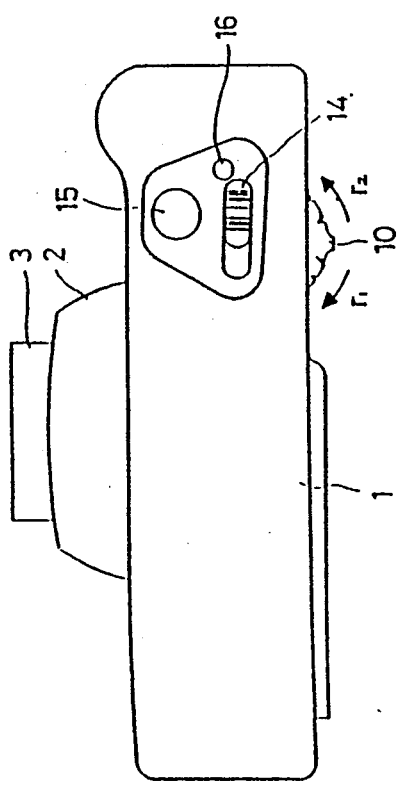
FIGS. 1 through 3 are external views of the camera, where
Figure 3:
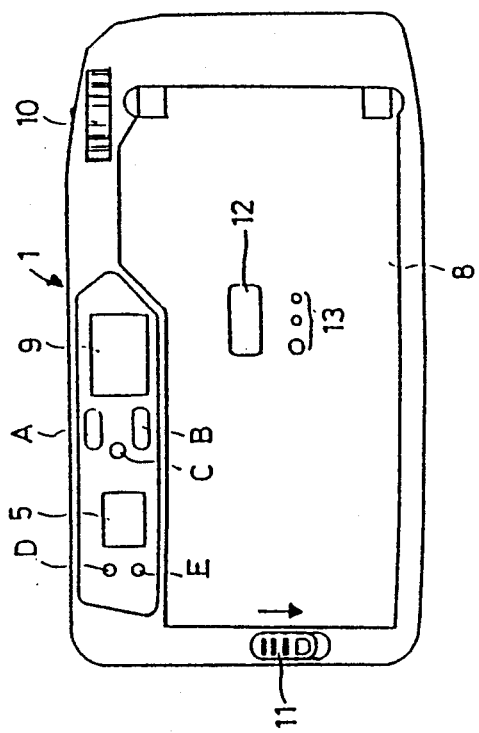
Figure 2:
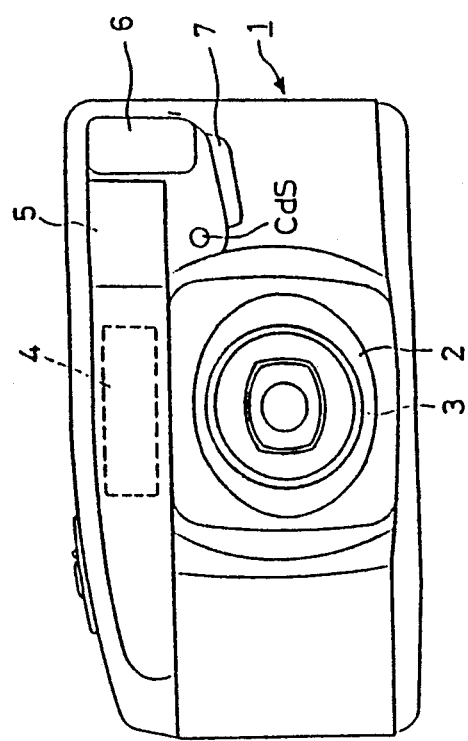

Illustrated in FIGS. 1 through 3 is a camera which employs a strobe charge control apparatus embodying the present invention.

The camera comprises, as shown in FIG. 1, a camera body 1 which has a stationary barrel 2 and a moving barrel 3. The front of the camera body 1 contains, as shown in FIG. 2, a distance measurement section 4, a finder window 5, a strobe 6, a photometric element such as a CdS, and a self-timer lamp 7. The back of the camera body 1 contains, as shown in FIG. 3, a back cover 8, an LCD indicator 9, a first mode button A, a second mode button B, a clear button C, a zoom lever 10, a green lamp indicator (LED) D, a red lamp indicator (LED) E, a back cover release lever 11, a date display section 12 and a date switch 13.

When the back cover release lever 11 is moved from an upward stop position to a downward stop position, the back cover 8 opens. When the back cover 8 is opened, the back cover release lever 11 is in the downward stop position, while when the back cover 8 is closed, the back cover release lever 11 returns to the upward stop position.

A rewind button, not shown, is located on the bottom of the camera body 1.

The upper section of the camera body 1 contains, as shown in FIG. 1, a power lever 14, a shutter button 15 and a macro button 16. The power lever 14 is slidable between power-ON and power-OFF positions.

The zoom lever 10 can be moved in a first direction indicated by an arrow r1 in FIG. 1, and a second direction indicated by another arrow r2.

The movable lens barrel 3 is moved, upon operating the lock lever 14 and/or the macro button 16, among a lock position which is an accommodated state, a zoom area extending between a wide angle extremity where a focal length becomes 35 mm and a tele-photo extremity where a focal length becomes 70 mm, and a macro position for close-up photography. In the zoom area, the movable lens barrel 3 is moved, upon operation of the zoom lever 10, between the wide angle extremity and the telephoto extremity.

Figure 4A:
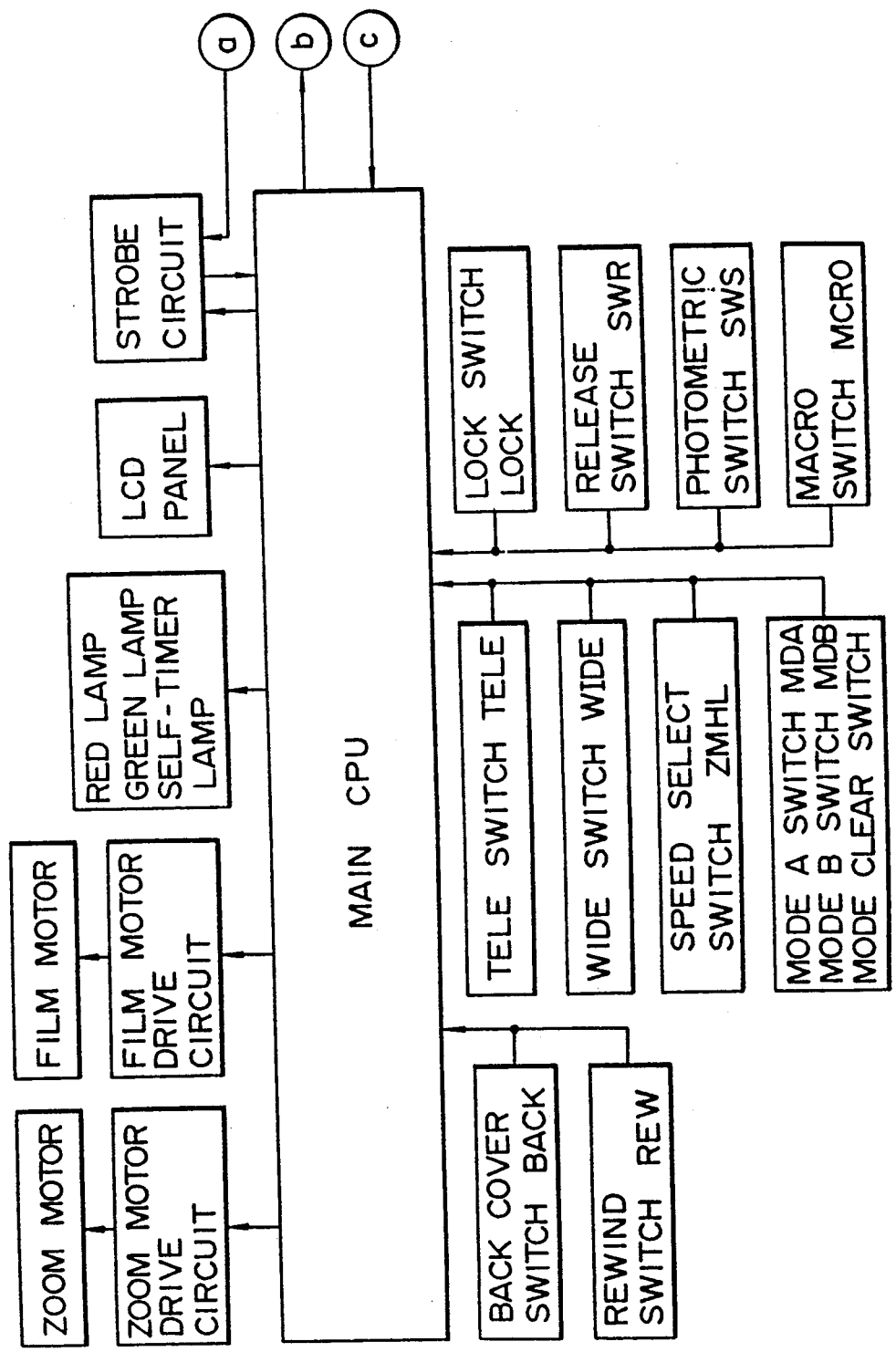
FIG. 4 is a block diagram of the control circuit.

FIG. 4 shows a control circuit configuration employed in the camera described above.

This control circuit comprises a main CPU (Central Processing Unit) and a sub CPU which is connected to the main CPU via a drive IC (Integrated Circuit). The sub CPU executes shutter-related processings in parallel with processings executed by the main CPU.

The main CPU performs the following functions in response to information inputted to the camera:

(1) Controls a zoom motor and a film motor via motor drive circuits;

(2) Controls illumination and blinking of the green lamp indicator D which provides a distance measurement-related indication, the red lamp indicator E which provides a strobe-related indication, and a self-timer lamp 7 which provides a self-timer-related indication;

(3) Controls indications on the LCD 9; and (4) Controls charging of a strobe circuit.

Information is inputted to the camera by the follow:

(1) Lock switch LOCK, which is set to be ON when the power lever 14 is set in its power-OFF position;

(2) Photometry switch SWS, which is set to be ON when the shutter button 15 is depressed halfway;

(3) Release switch SWR, which is set to be ON when the shutter button 15 is fully depressed;

(4) Macro switch MCRO, which is set to be ON when the macro button 16 is depressed;

(5) Zoom telephoto switch TELE, which is set to be ON when the zoom lever 10 is displaced from a center, nuetral position toward the telephoto side r2;

(6) Zoom wide angle switch WIDE, which is set to be ON when the zoom lever 10 is displaced from a center, neutral position toward the wide angle side r1;

(7) Mode A switch MDA, mode B switch MDB and clear switch MDC, which are set to be ON when the mode buttons A, B and C, respectively, are depressed;

(8) Back cover switch BACK, which is set to be OFF when the back cover release lever 11 is pressed down, and set to be ON when the back cover 8 is closed and the lever 11 returns to its locked position; and (9) Rewind switch REW, which is set to be ON when a rewind button is pressed.

On the other hand, the sub CPU controls a distance measuring unit which comprises an infrared LED (Light Emitting Diode) and a position sensor PSD via an autofocus IC. The sub CPU sends to the main CPU distance measurement data based upon output of the autofocus IC as well as photometric data based upon output of the photometric element CdS.

The drive IC controls the shutter circuit according to commands from the sub CPU and outputs a trigger signal TRG from the strobe circuit.

Figure 5:
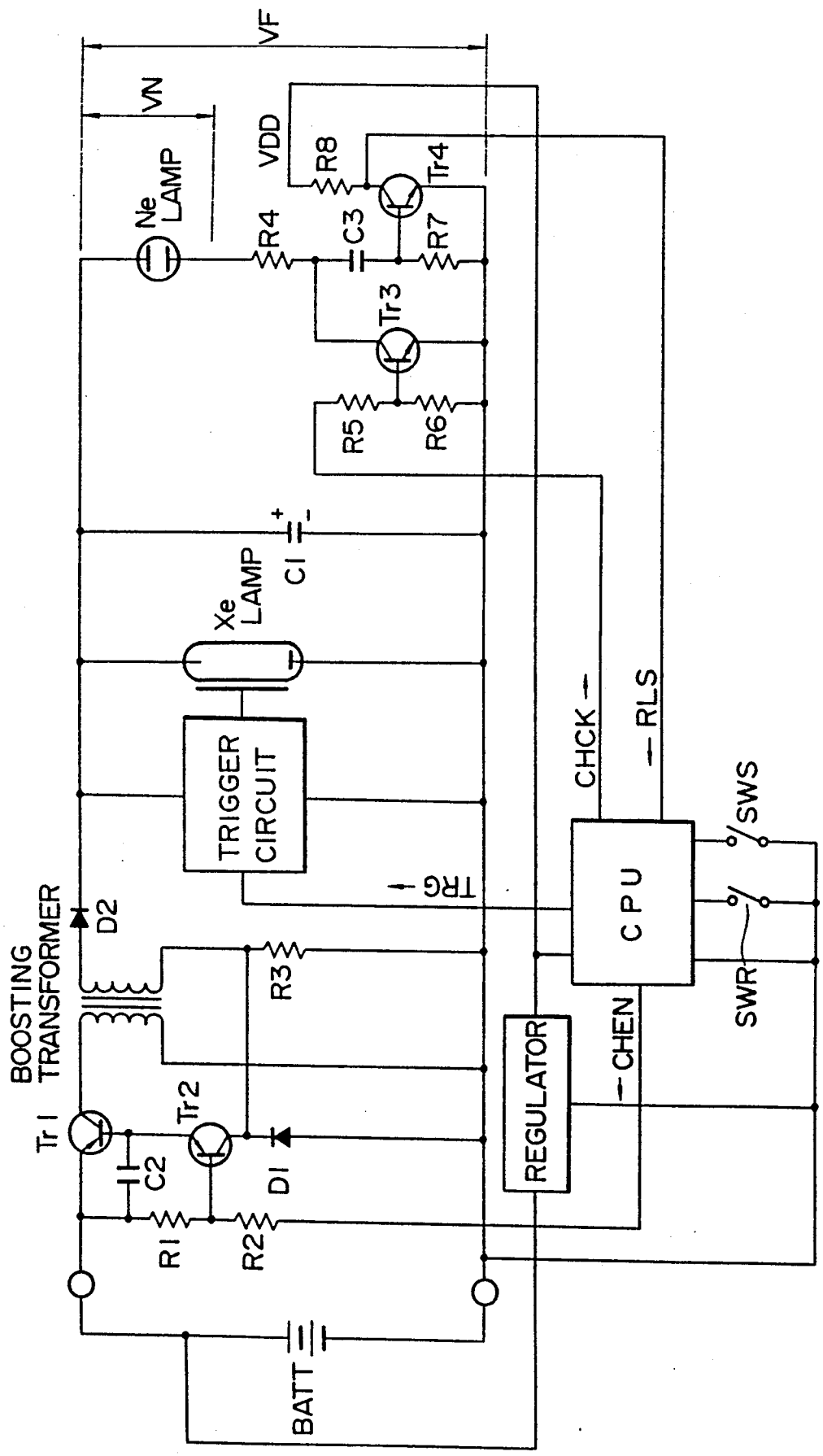
FIG. 5 is a circuit diagram of the strobe and the adjacent section.

FIG. 5 shows the detailed constitution of the strobe circuit. In this figure, the main CPU and the sub CPU are integrally illustrated as a CPU.

This circuit comprises a CPU, a regulator for stabilizing supply voltage to the CPU regardless of voltage change in a battery BATT due to charging and other causes a boosting circuit for raising the battery voltage in response to a charge enabling signal from the CPU to start charging a main capacitor C1, a trigger circuit for illuminating a Xe (xenon) lamp in response to a trigger signal TRG from the CPU, and a voltage detecting circuit for detecting charge voltage in the main capacitor C1 in the form of RLS pulses in response to a voltage check signal CHCK from the CPU.

The boosting circuit comprises a boosting transformer, oscillating transistors Tr1 and Tr2, resistors R1, R2 and R3, a capacitor C2, and diodes D1 and D2. When the charge enabling signal CHEN becomes L (low level output), changing starts. When the signal becomes H (open), changing stops.

The voltage detecting circuit comprises a Ne (neon) lamp, a switching transistor Tr3, and RLS pulse generating transistor Tr4, resistors R4 through R8, and a capacitor C3. When the voltage check signal CHCK changes from H (high level output) to L (low level output), the voltage detecting circuit generates the RLS pulses in proportion to the voltage. The Ne lamp is turned ON when a voltage exceeding 270 V is applied, and a voltage around 220 V is maintained, regardless of the current value, while the Ne lamp remains turned ON. The hysteresis of the voltage required to turn the lamp ON and that required to maintain the ON-state is used for generating the RLS pulses.

Figure 6:
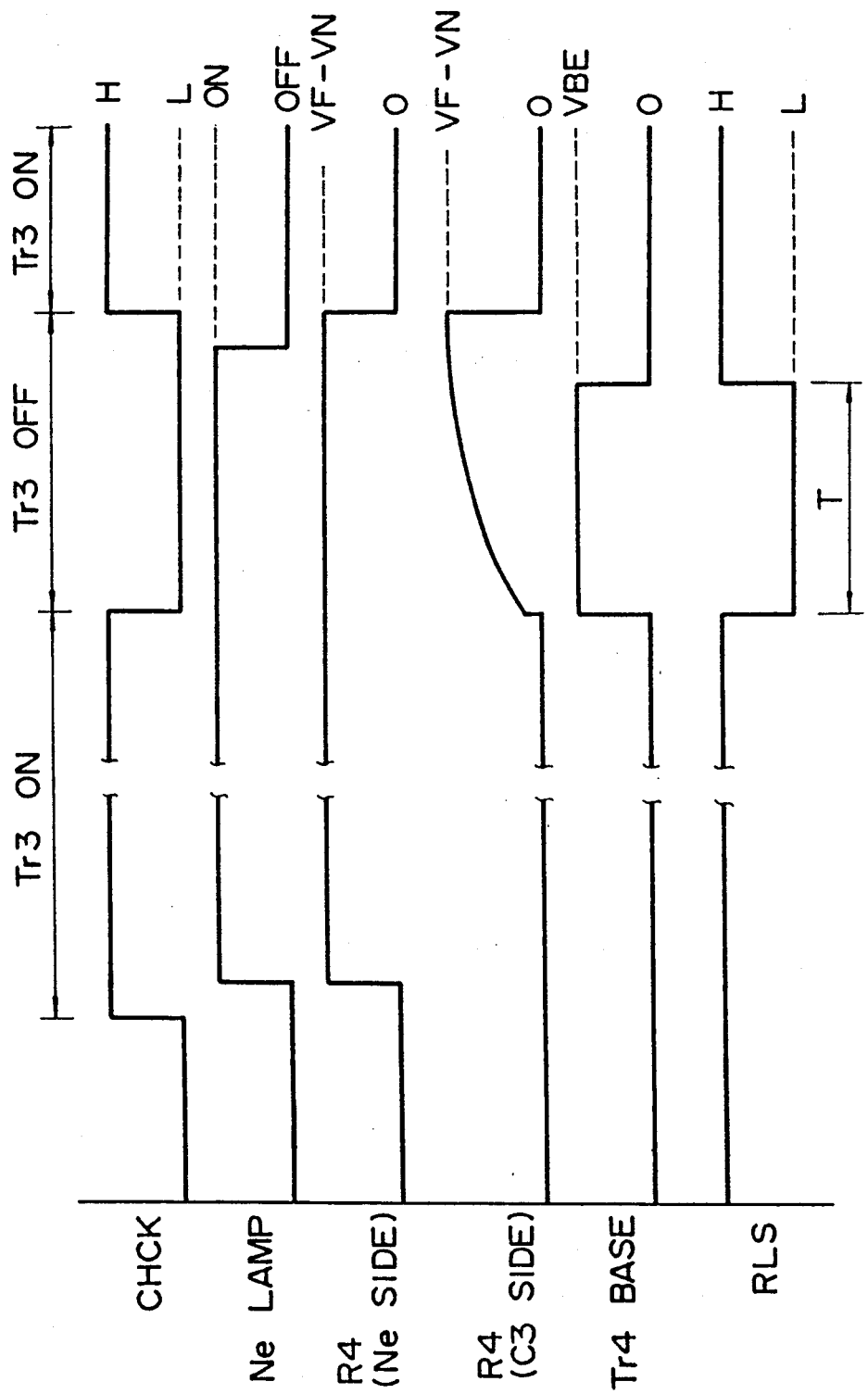
FIG. 6 is timing chart showing a voltage check processing.

How voltage is detected is hereinafter explained by referring to FIG. 6.

When the voltage check signal CHCK becomes H, the transistor Tr3 is turned ON and the capacitor C3 is discharged, and simultaneously the minus side of the Ne lamp is connected to the ground side through the resistor R4 and the transistor Tr3. At this time, if the charged voltage VF is 270 V or more, the Ne lamp is turned ON after a certain delay time has passed since the signal CHCK became H, and current flows in order through the Ne lamp, the resistor R4 and the transistor Tr3. Thus, the voltage of the resister R4 on the Ne lamp side becomes VF−VN, where the ON-state holding voltage VN for the Ne lamp is subtracted from the charge voltage VF.

Then, when the signal CHCK is turned to L and thereby the transistor Tr3 is turned OFF, the current which has flown from the resistor R4 to the transistor Tr3 flows from the resistor R4 to the capacitor C3 for the time being. Consequently, the capacitor C3 is charged and the transistor Tr4 is turned ON, and thus the RLS becomes L.

As charging of the capacitor C3 progresses, the potential on the capacitor C3 side of the resister R4 gradually increases, and the current becomes insufficient to hold the Ne lamp in its ON-state. Thus, the Ne lamp turns OFF and the current does not flow from the resistor R4 to the capacitor C3. Consequently, the transistor Tr4 is turned OFF and the RLS becomes H.

The turn-OFF timing of the Ne lamp is correspondingly delayed as the charged voltage VF increases. Thus, a time T (=the RLS pulse width) during which the RLS is L, is determined by (VF−VN).

Thus, by detecting the pulse width T, the charged voltage VF can be detected.

Figure 7:
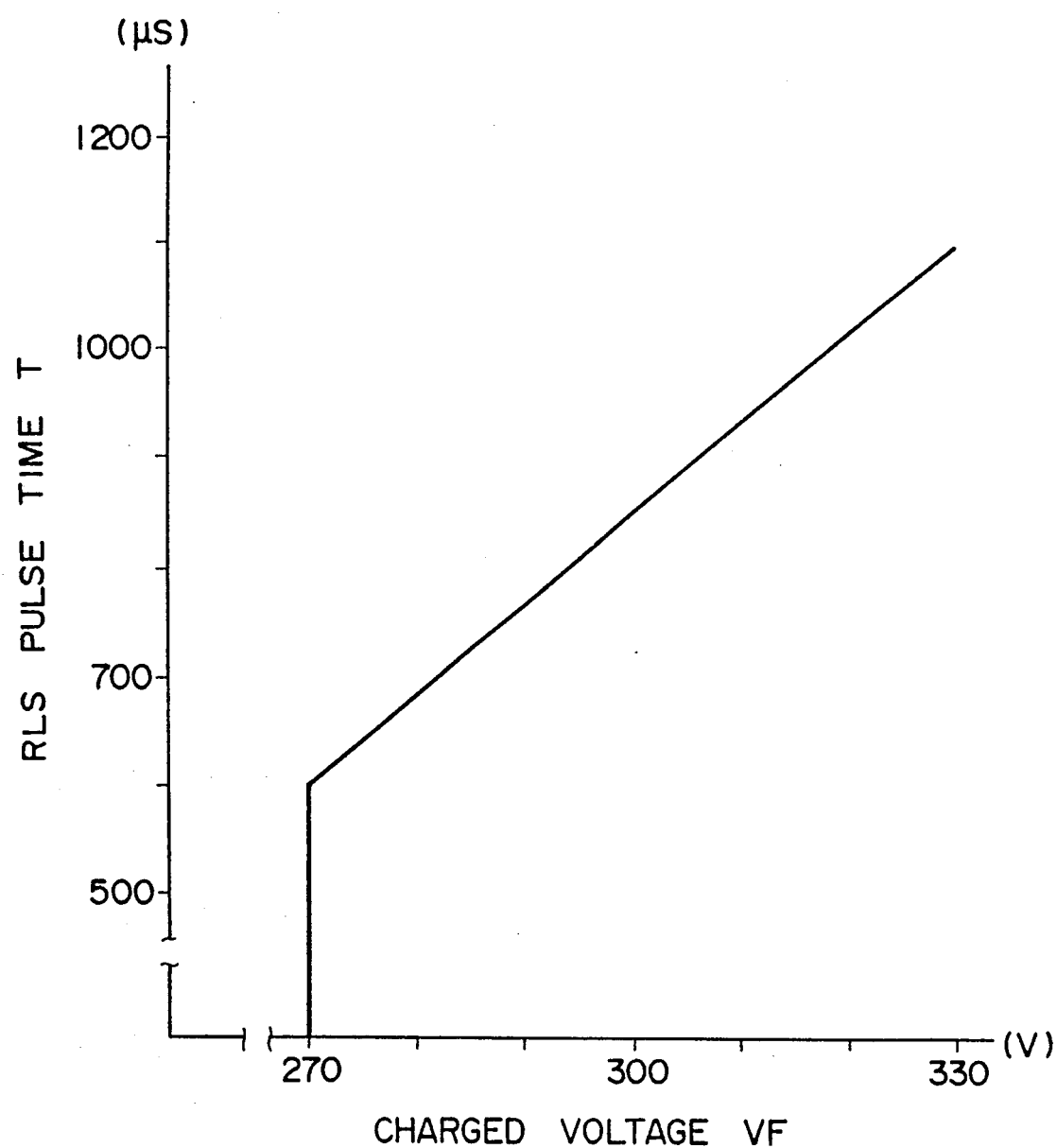
FIG. 7 is a chart showing the relation between RLS pulse time periods and voltages.

FIG. 7 shows an example of the relation between the charged voltage and the RLS pulse width.

Meanwhile, when the charging voltage is 270 V or less, even if the transistor Tr3 is turned ON, the Ne lamp does not turn ON and thereby the RLS remains H.

Next, functions of the mode buttons A and B are explained below.

The mode button A functions to set an exposure mode. As exposure modes, 6 modes are provided, i.e., an auto mode (automatic strobe emission mode), a strobe ON mode (forced strobe emission mode), a strobe OFF mode (strobe emission prevented mode), an exposure compensation mode, a bulb mode and a bulb and strobe ON mode.

For the bulb mode or the bulb and strobe ON mode, 8 manual shutter times are available.

The mode button B functions to set a photographing mode. As photographing modes, 6 modes are provided, i.e., a one-frame photographing mode, a sequential photographing mode, a self-timer photographing mode, a double self-timer photographing mode, a multiple photographing mode, and an interval photographing mode.

For the interval photographing mode, 16 interval periods are available.

The initial value of the manual shutter time is bulb, and that of the interval period is 60 sec. The initial values are set by executing a MODE INITIALIZE subroutine or by turning ON the clear button C.

Next, the programs stored in the main CPU will now be described with reference to FIGS. 8 through 27.

MAIN operation

First, a MAIN operation and associated RESET operation will be described, with reference to FIGS. 8 through 13. The MAIN operation executes the basic operation of the camera. Other functions are performed by branching from or being controlled by the MAIN operation according to the various conditions.

Figure 8:
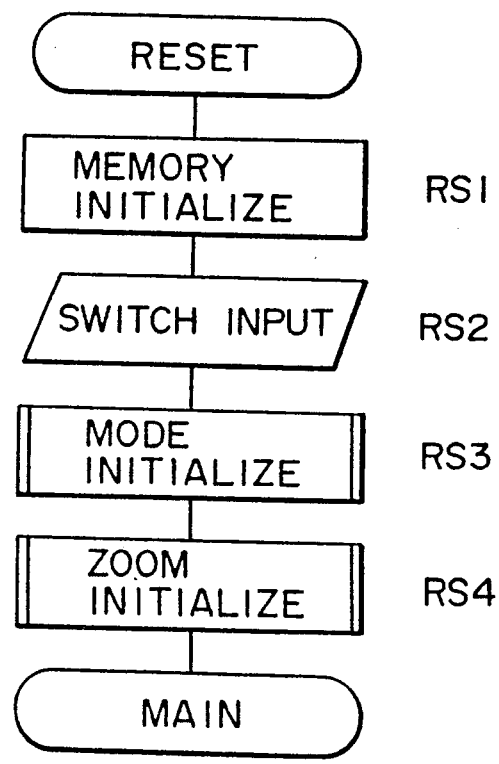
Figure 9B:
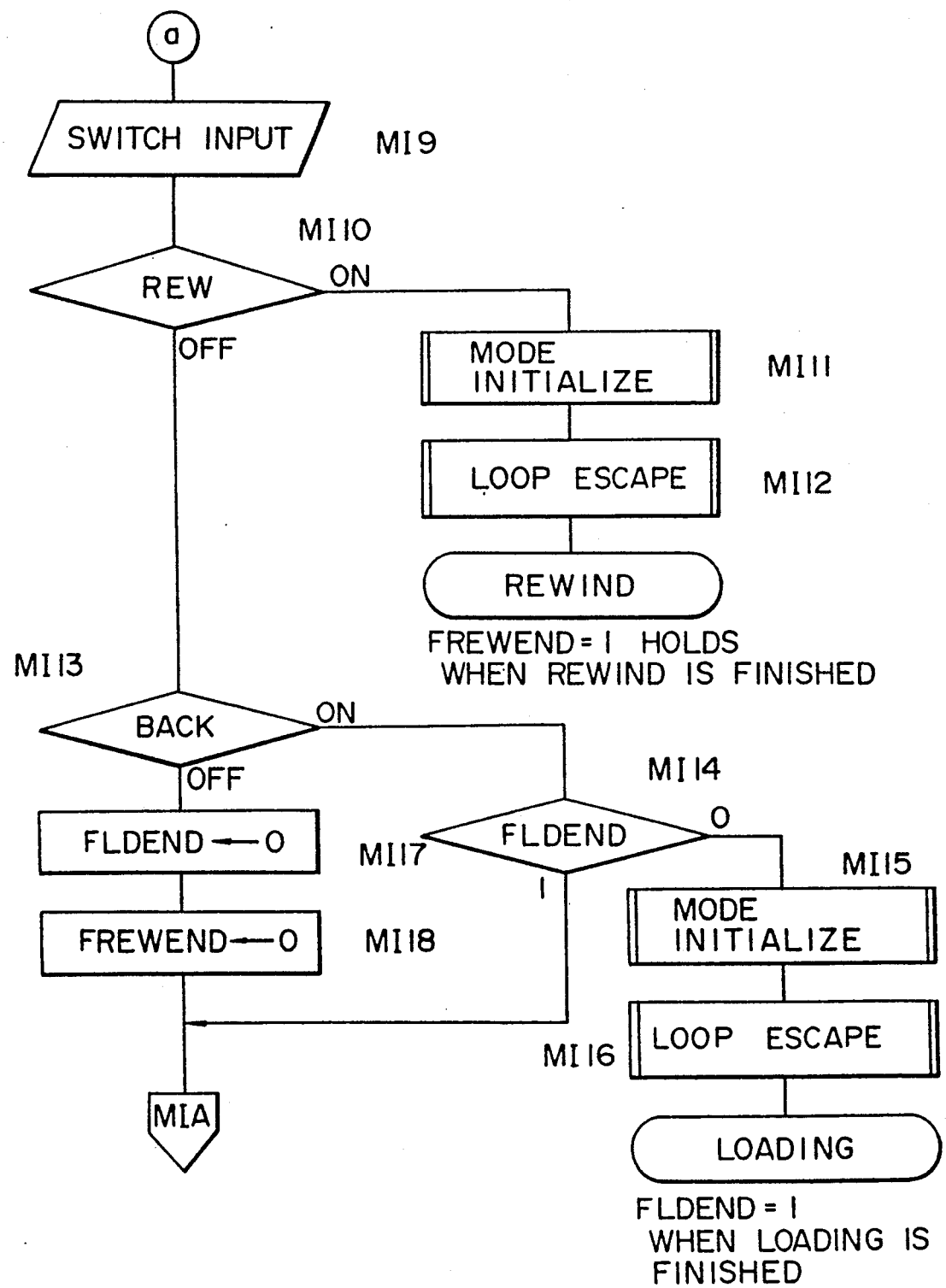

When power is turned ON, reset of the main CPU is released and the RESET operation shown in FIG. 8 starts. The main CPU initializes the camera memory and inputs switch data (steps RS1 and RS2) before performing a MODE INITIALIZATION subroutine in step RS3 and a ZOOM INITIALIZATION subroutine in step RS4. A series of instructions that comprise the MAIN operation shown in FIG. 9 are then executed. The MODE INITIALIZATION subroutine resets various mode settings to initial values to set the automatic strobe emission and one-frame photographing modes.

In the MAIN operation, a 1-second timer, used for indication holding, is cleared in step MI1.

In steps MI2 through MI4, the photometry switch SWS, the release switch SWR, the wide-angle switch WIDE, the telephoto tele switch TELE, the mode switch MDA, the mode switch MDB, the clear switch MDC and the macro switch MCRO are set to OFF and a switch judgement flag FSWOFF is set to 1. The flag FSWOFF is set to 0 if some of the aforementioned switches is turned ON.

In steps MI5 through MI8, when the photometry switch SWS, the release switch SWR, the wide-angle switch WIDE and the telephoto switch TELE are set to OFF and forbidden photographing combination modes are not selected, a photometry switch effective flag FSWSEN is set to 1. When some of the aforementioned switches is set to ON or forbidden combination modes are set, the flag FSWSEN is set to 0.

In step MI9, the status of each of the above-mentioned switches are inputted, and the processing is executed thereafter according to the inputted switch data.

Figure 10:
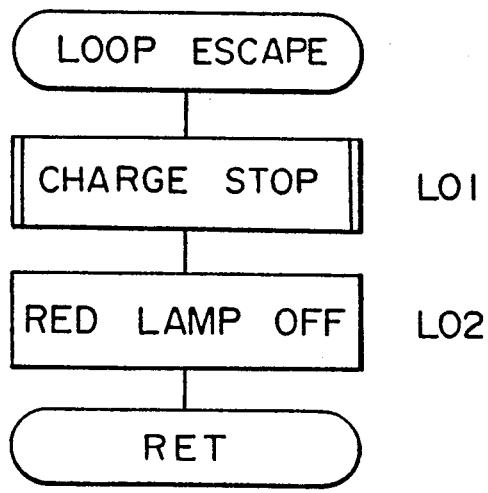

When the rewind switch REW is judged to be ON (step MI10), the MODE INITIALIZING subroutine is performed (step MI11), a LOOP ESCAPE subroutine, shown in FIG. 10, is then executed in step MI12. This subroutine comprises two steps, of which step L01 stops charging of the strobe circuit and step L02 turns OFF the red lamp charge indication, and is called every time, before the processing branches from the MAIN operation to other one.

When the LOOP ESCAPE subroutine is completed, the MAIN operation diverges to a series of instruction that comprises a REWIND operation. When the REWIND operation has completed rewinding the film in the camera, a rewind complete flag FREWEND is set to 1 and the processing is advanced by jumping to the beginning of the MAIN operation.

When the back cover 8 is closed (turning ON the back switch BACK), step MI14 is performed to determine whether the film has finished loading. This is performed by checking the flag FLDEND. If the film has not finished loading (=the flag FLDEND is 0), the processing continues to step MI15, wherein the MODE INITIALIZATION subroutine is performed once more. Then, at step MI16, the LOOP ESCAPE subroutine is performed so as diverge to a series of instructions that comprise a LOADING operation. When the LOADING operation is finished (=the flag FLDEND is 1), the processing goes to step MI19.

Meanwhile, upon completion of loading, the flag FLDEND is set to 1 and the processing is advanced by jumping to the beginning of the MAIN operation.

When the back cover 8 is open, both FLDEND and FREWEND are reset to 0 (steps MI17 and MI18).

Figure 11A:
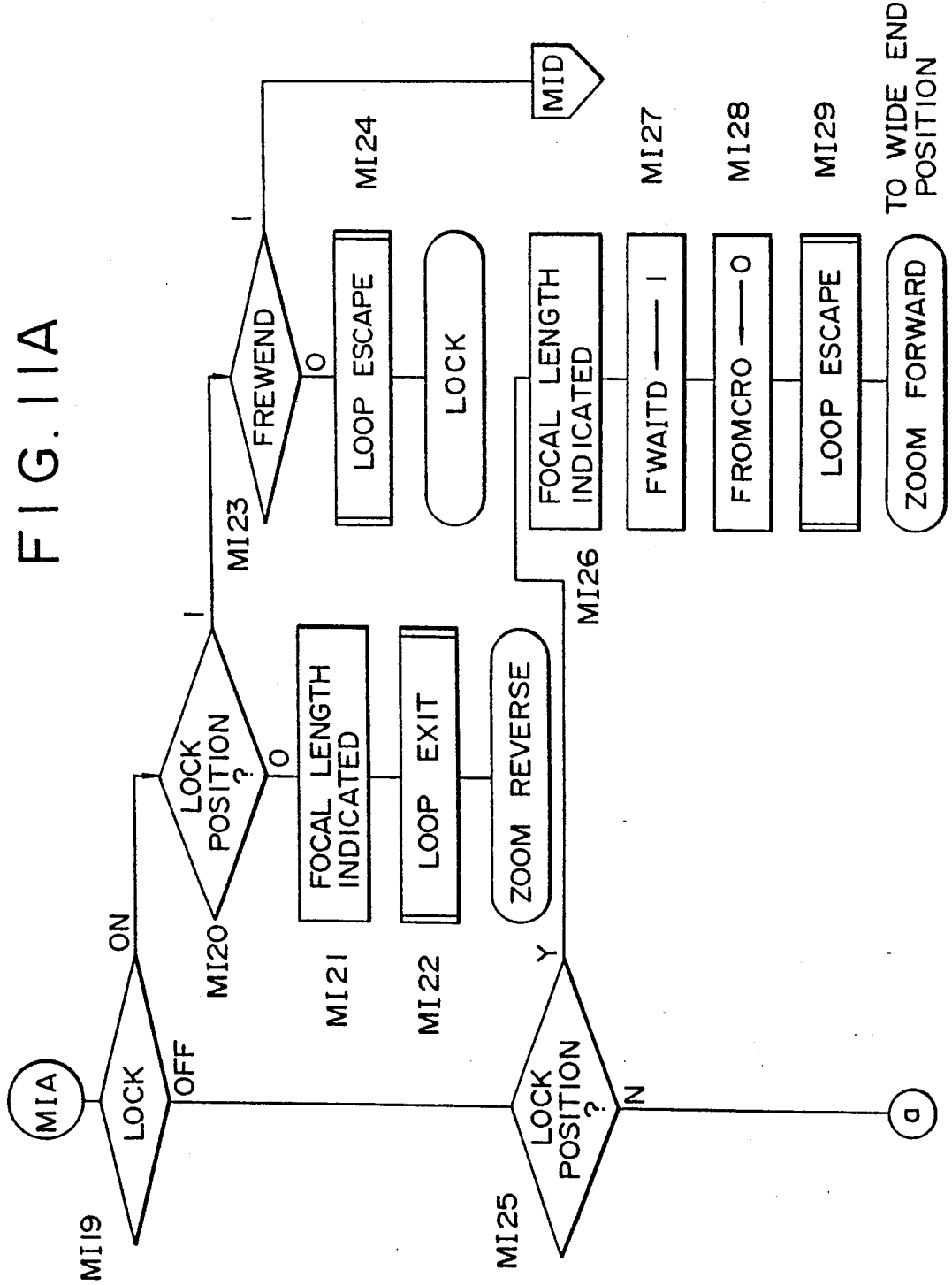
Figure 13A:
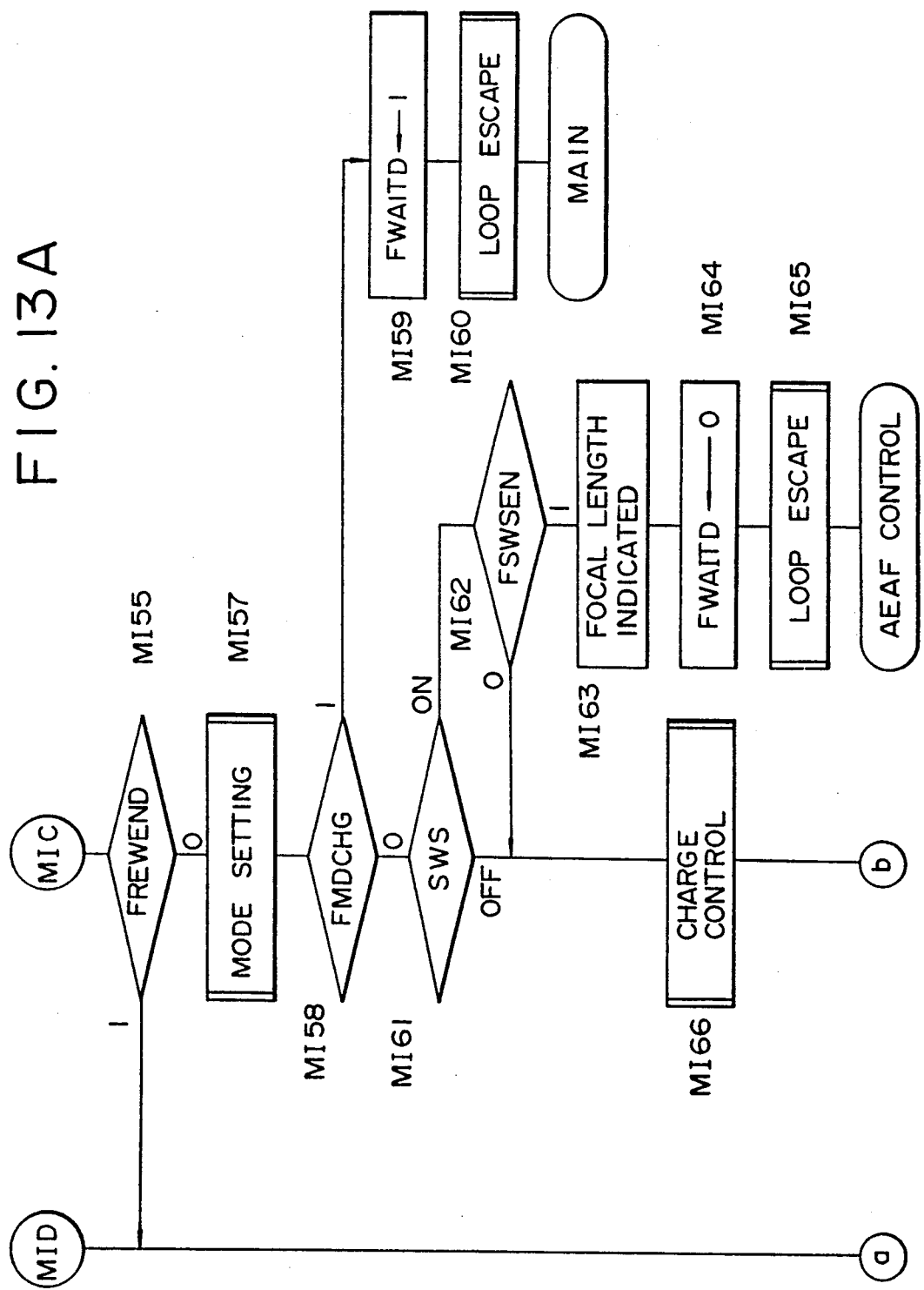
Figures 13, 13B:
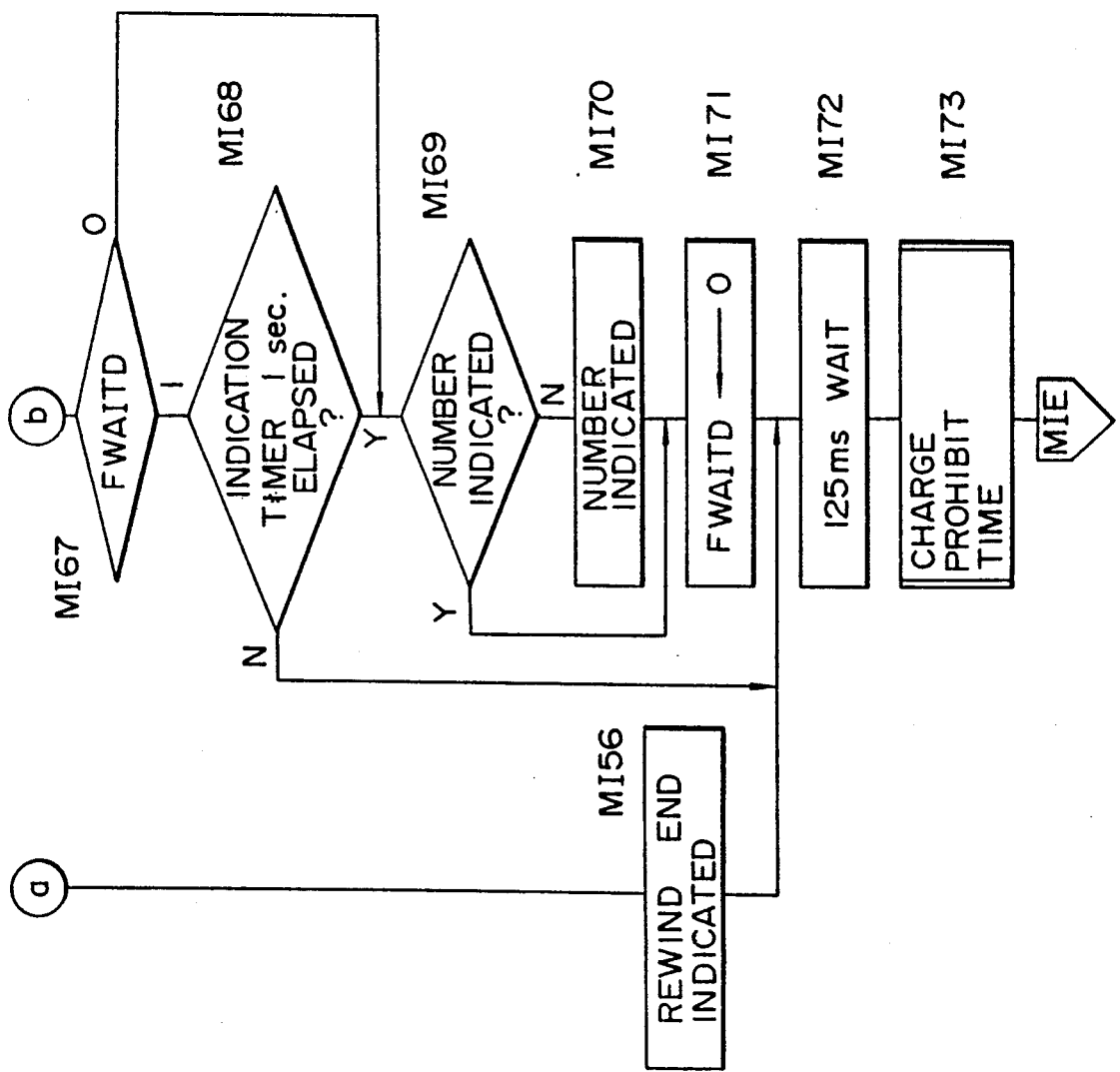

In steps MI19 through MI24 in FIG. 11, shown is the processing to be executed when the lock switch LOCK is turned from OFF to ON, that is, the power lever 14 moved from the power-ON position to the power-OFF position. If the photographing lens is not in the lock position, the display changes from indicating the film frame number to indicating the focal length of the lens (step MI21). Then, the LOOP ESCAPE subroutine (step MI22) is executed. Thereafter, processing diverges to a series of instructions that comprise a ZOOM REVERSE operation, so that the lens is pulled back to the lock position. When the lens is already in the lock position and the REWIND operation has not finished, the processing goes to step MI24 so as to execute the LOOP ESCAPE subroutine so that processing can diverge to a series of instructions that comprises a LOCK operation described later. If the REWIND operation has finished, the processing is advanced by jumping to "MID" of the MAIN operation, shown in FIG. 13.

When the lock switch LOCK is OFF and it is descriminated in step MI25 that the lens is in the lock position, the focal length is indicated on the display (step MI26) for a period of one second (step MI27) by setting an indication hold flag FWAITED to 1. Thereafater, a macro command flag FRQMCR is set to 0 (step MI28). Then, the LOOP ESCAPE subroutine (step MI29) is executed so that the processing can diverge to a series of instructions that comprise a ZOOM FORWARD operation. In this operation, when the macro request flag FRQMCRO is 0, the lens is moved from the lock position to the wide extremity, while, when this flag is set to 1, the lens is moved to the macro position.

In steps MI30 through MI36, if the macro switch MCRO is ON, the focal length indication is displayed and the indication hold flag FWAITD is set to 1. (MI32) Then, the test is made to determine whether the photographing lens is in the macro position (step MI33). If it is in the macro position, the indication hold timer is cleared (step MI34) and restarted. The processing then advances by jumping to "MIC", shown in FIG. 13. If the lens is not in the macro position, the macro command flag FRQMCRO is set to 1, and and the processing diverges to the ZOOM FORWARD operation via the LOOP ESCAPE subroutine so that the lens moves towards the macro extremity.

In steps MI37 through MI43, when the telephoto switch TELE is ON, the focal length indication is displayed and the indication hold flag FWAITD is set to 1. When the lens is not in the tele extremity, it is descriminated whether the lens is in the macro position or in the zoom area, upon completion of the LOOP ESCAPE subroutine. (MI41) When the lens is in the zoom area, the processing diverges to a series of instructions that comprises a TELE SHIFT operation (MI46) to move the lens to the telephoto side. If it is in the macro position, the processing diverges to the ZOOM REVERSE operation to take back the lens to the tele extremity.

When the lens is already in the tele extremity, the display hold timer is cleared (MI43) and the count of one second is restarted.

In steps MI44 through MI50, when the wide-angle switch WIDE is ON, the focal length indication is displayed and the indication hold flag FWAITD is set to 1. If the lens is in the wide extremity, the display hold timer is cleared and restarted. When the lens is not in the wide angle extremity, it is descriminated whether the lens is in the macro position or in the zoom area, upon completion of the LOOP ESCAPE subroutine.

When the lens is in the zoom area, the processing diverges to a series of instructions that comprises a WIDE SHIFT operation to move the lens to the wide-angle side. If it is in the macro position, the processing diverges to the ZOOM REVERSE operation to take back the lens to the tele extremity.

Thus, the photographing lens is set to the macro position, when the macro switch MACRO is ON. To retract the lens from the macro position to the zoom area, the zoom lever should be moved from its center, neutral position towards either direction.

In steps MI51 through MI54 in FIG. 12, in case it is necessary to shift the lens, that is, if the macro tele shift flag FMTSIFT is set to 1, the focal length of the lens is displayed and the indication hold flag FWAITD is set to 1. Thereafter, the processing diverges to the ZOOM REVERSE operation to shift the lens to the tele extremity via the LOOP ESCAPE subroutine.

In the embodiment constructed according to this invention, the distance limit for taking macro photographs is approxmately 1 meter (m). Thus, when the lens is in the macro position and the distance measurement indicates a distance greater than 1 m, it is impossible to take an infocus photograph. If the shutter button is depressed under this condition, in this embodiment, shutter release is locked and the lens is shifted to the tele extremity from the macro position. The flag FMTSIFT is set in a LENS LATCH (LL) subroutine that is called by a series of instructions that comprise an AUTOMATIC EXPOSURE/AUTOMATIC FOCUS (AEAF) CONTROL operation.

In step MI55, the condition of the rewind complete flag FREWEND is checked. If the rewind operation has finished, "00 EX" is displayed on the LCD display (step MI56). If the flag is 0, i.e., the rewind operation is not finished, a MODE SETTING subroutine is performed (step MI57).

After the switch judgement flag FSWOFF has been set in steps MI2 through MI4 the MODE SETTING subroutine is executed only when all switches are set to OFF by the previous inputs. If some switches are set to ON, the procedure returns to the MAIN operation without changing any setting.

If there is a mode change in the MODE SETTING subroutine, a mode change flag FMDCHG is set to 1, while if there is no change, it is set to 0.

When the processing returns from the MODE SETTING subroutine to the MAIN operation, the state of the flag FMDHG is checked (step MI58). If there is a mode change, the indication hold flag FWAITD is set to 1 in step MI59 before the processing jumps to the beginning of the MAIN operation via the LOOP ESCAPE subroutine.

If there is no change, the photometry switch SWS and the photometry switch effective flag FSWSEN are checked in steps MI61 and MI62. When the specified conditions are satisfied, the focal length indication is displayed in steps MI63 through M165 and the indication hold flag FWAITD is cleared. The processing then diverges to the AEAF CONTROL operation, via the LOOP ESCAPE operation, so as to execute the shutter-related controls.

The AEAF CONTROL operation is executed when the photometry switch SWS is ON, every switch data stored in each memory of the SWS, SWR, TELE and WIDE are OFF and the mode that allows a photograph to be taken is set. That is, the AEAF CONTROL operation is performed only when the SWS is switched from OFF to ON. Therefore, if the zoom lever is operated, for instance, the MAIN operation continues without exectecting the AEAF CONTROL operation.

In step MI66, a CHARGE CONTROL subroutine described later, which controls the strobe flash circuit, is called. Indication change is then executed in steps MI67 through MI71.

If holding of display indication is requested, it is checked whether 1 second has passed since the indication hold timer was cleared. Before 1 second has passed, the presently displayed indication continues.

When holding of display indication is not requested, or 1 second has passed, the film frame number is re-displayed and the indication hold flag FWAITD is cleared.

Thus, the indication of the film frame number is given preference over other indications, unless the other data to be shown is only temporarily displayed.

After pausing for 125 ms in step M172, a CHARGE PROHIBIT TIME subroutine described later is called. The processing then jumps to step M12 of the MAIN operation.

In this camera, start of strobe charging is delayed in a charge prohibiting time which is set depending upon frequency of strobe flashing, so as to prevent the strobe circuit from being heated due to continuous use of strobe flashings. The CHARGE PROHIBIT TIME subroutine is to shorten the predetermined charge prohibiting time.

The aboves are the explanations for the MAIN operation, and various subroutines and operations diverging therefrom will now be described.

CHARGE CONTROL subroutine

Figure 14B:
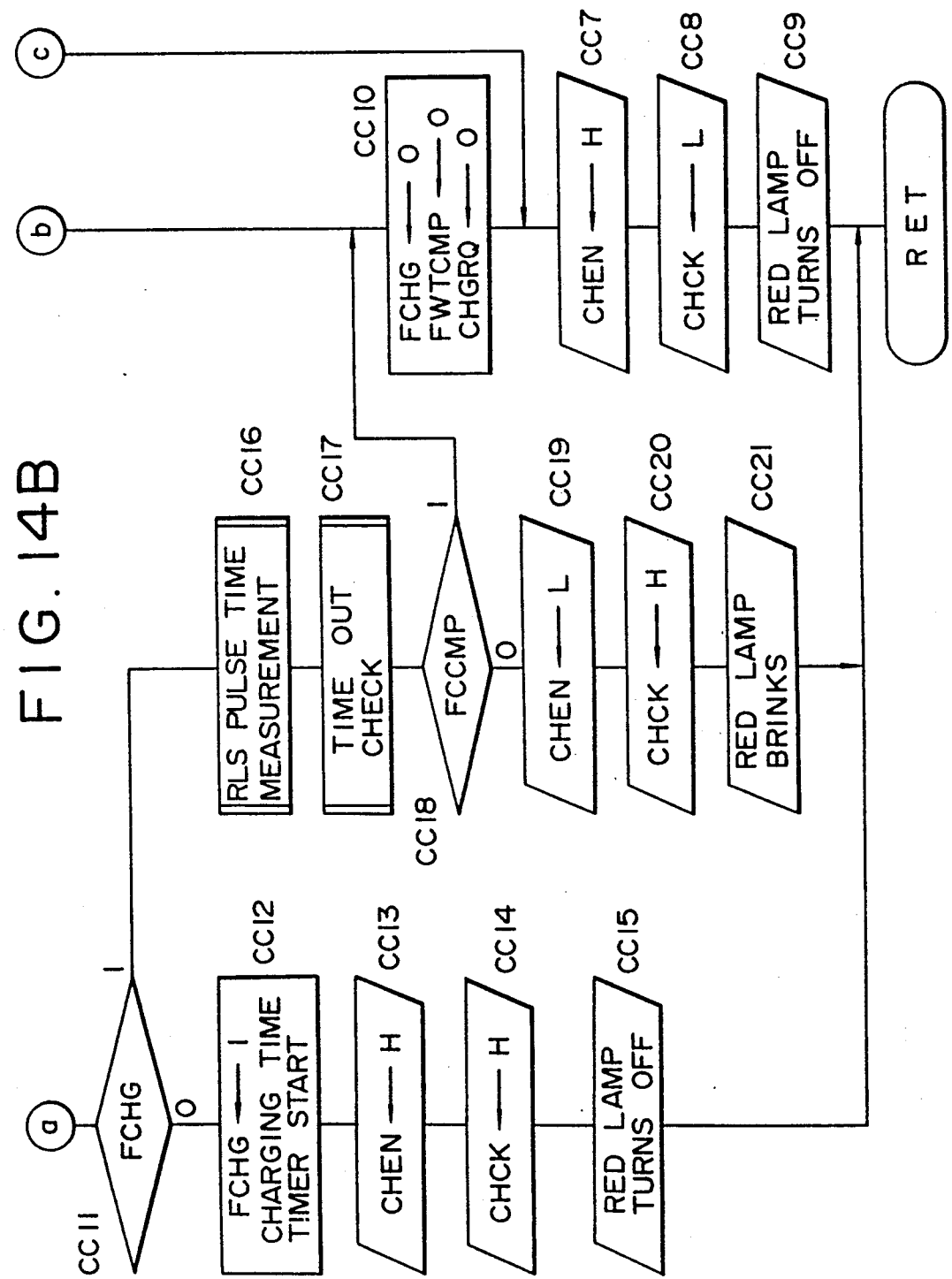

Referring to FIG. 14, the CHARGE CONTROL subroutine, which is called in the MAIN operation, (MI66) a RELEASE-WAIT CHARGE subroutine or an INTERVAL CONTROL subroutine, both described later, is explained. This subroutine is principal one to execute charge operation, and is periodically called in every 125 ms from any operation or subroutine.

In step CC1, it is determined whether the charge prohibiting time has elapsed by checking a prohibiting time completion flag FWTCMP. When the time has not elapse (FWTCMP=0), in step CC2, a CHARGE PROHIBIT subroutine described later is executed. Then, in step CC3, it is discriminated whether charging is prohibited by checking a charge prohibiting time flag FWTSTR. If charging is prohibited (FWTSTR=1), the processing diverges to step CC7 and a CHARGE STOP operation is executed.

When the charge prohibiting time elapsed and the prohibiting time completion flag FWTCMP is set to 1, or when the prohibiting time elapsed in the CHARGE PROHIBITING subroutine and the charge prohibiting time flag FWTSTR is set to 0, the charge request flag FCHGRQ is checked in step CC5. If strobe charge is requested (FCHGRQ), the processing advances to step CC6. If not, the processing advances to step CC4.

In the CHARGE STOP operation, a prohibiting time reduction flag FCNTSTP is set to 0, in step CC4, so as to enable the charge prohibiting time to be shortened in the CHARGE PROHIBIT TIME subroutine. In steps CC7 through CC9, after charging and voltage checking are stopped and the red lamp is turned out, the processing returns back to the step being called.

If charging is requested, it is judged, in step CC6, whether 8 seconds or more have passed after charging started by checking a time out flag FTOUT set in a TIME OUT CHECK subroutine described later. If 8 seconds or more have passed (FTOUT=1), a charge on flag FCHG, the prohibiting time completion flag FWTCMP and the charge request flag FCHGRQ are set to 0, in step CC10, and charging is stopped.

If it has not yet passed 8 seconds, in steps CC11 through CC15, the charge on flag FCHG is set to 1 so that the charging timer starts, and the voltage check signal is outputted while charging is being prohibited. This is because the present voltage before charging starts is uncertain.

If charging is being executed, the processing diverges from step CC11 and a RLS PUSE TIME MEASUREMENT subroutine and the TIME OUT CHECK subroutine are executed in steps CC16 and CC17. By checking the charge completion flag FCCMP which is set in both subroutines, it is judged whether charging is completed. This flag FCCMP is set to 1 when charged voltage exceeds 330 V in the RLS PULSE TIME MEASUREMENT subroutine. In case the voltage does not reach 330 V after 8 seconds have passed from the start of charging, however, the flag FCCMP is set to 1 if charged voltage exceeds 270 V.

When charging is completed (FCCMP=1), the CHARGE STOP operation is executed via step CC10. If charging is not completed, the charge enable signal and the voltage check signal are outputted and the processing returns to the MAIN operation (steps CC19 through CC21).

Thus, before start of charging, steps CC12 through CC15 are executed once, and the charge check signal is outputted to check the present voltage. Charging then starts, if the voltage does not reach 330 V, in 125 ms via steps CC16 through CC21. During charging, steps CC16 through CC21 are repeatedly executed. At the time of completion of charging, steps CC7 through CC7 are executed.

CHARGE PROHIBIT subroutine

FIG. 15 shows a CHARGE PROHIBIT subroutine, which is called in step CC2 of the CHARGE CONTROL subroutine.

This subroutine is called when the charge prohibiting time is not completed, and a charge prohibiting time TW and the value of the prohibiting time timer are compared so that strobe charging is postponed in the charge prohibiting time to prevent heating of the strobe circuit. The charge prohibiting time TW is determined according to a prohibiting time data n which is set in the RLS PULSE TIME MEASUREMENT subroutine and the CHARGE PROHIBIT TIME subroutine.

If the prohibiting time timer has not yet started in step CS1 (FWTSTR=0), it is started and the prohibiting time flag and a prohibiting time reduction flag are set to 1, in steps CS2 and CS3, so that charging is stopped in the CHARGE CONTROL subroutine of FIG. 14.

In steps CS4 through CS8, if the prohibiting time data n is larger than 50, a prohibiting time 10 sec. setting flag FWT10S is set to 1 so that the data n is forcedly set to 50 and the prohibiting time becomes 10 seconds. If the data n is larger than 7 and smaller than 50, the 10 sec. setting flag FWT10S is cleared and the processing returns to the MAIN operation.

If the data n is 7 or less, in steps CS9 through CS11, the CHARGE PROHIBIT TIME subroutine is canceled and the processing returns to the MAIN operation.

In case the CHARGE PROHIBIT subroutine is executed after the CHARGE PROHIBIT TIME subroutine is started, the processing advances from step CS1 to CS12.

In steps CS12 through CS15, if the 10 sec. flag FWT10S is not set to 1, the prohibiting time TW is set to $n \times 125$ ms, and it is checked whether the value in the prohibiting time timer exceeds the prohibiting time TW in step CS14. If the 10 sec. flag FWT10S is set to 1, it is checked whether the value in the prohibiting time timer exceeds 10 seconds.

Before the prohibiting time timer counts TW or 10 sec., the processing directly returns to the MAIN operation. After the timer counts TW or 10 sec., in steps CS9 through CS11, the prohibiting time is completed and then the processing returns to the MAIN operation.

Thus, the prohibiting time is 0 ms if $n < 7$, $n \times 125$ ms if $7 \leq n < 50$, and 10 seconds if $n \geq 50$. As described later, 2 is added to n for every one charging while 1 is subtracted from n at 4 seconds intervals. Accordingly, the charge prohibiting time can be set corresponding to the frequency of strobe flashing.

RLS PULSE TIME MEASUREMENT subroutine

Figure 16B:
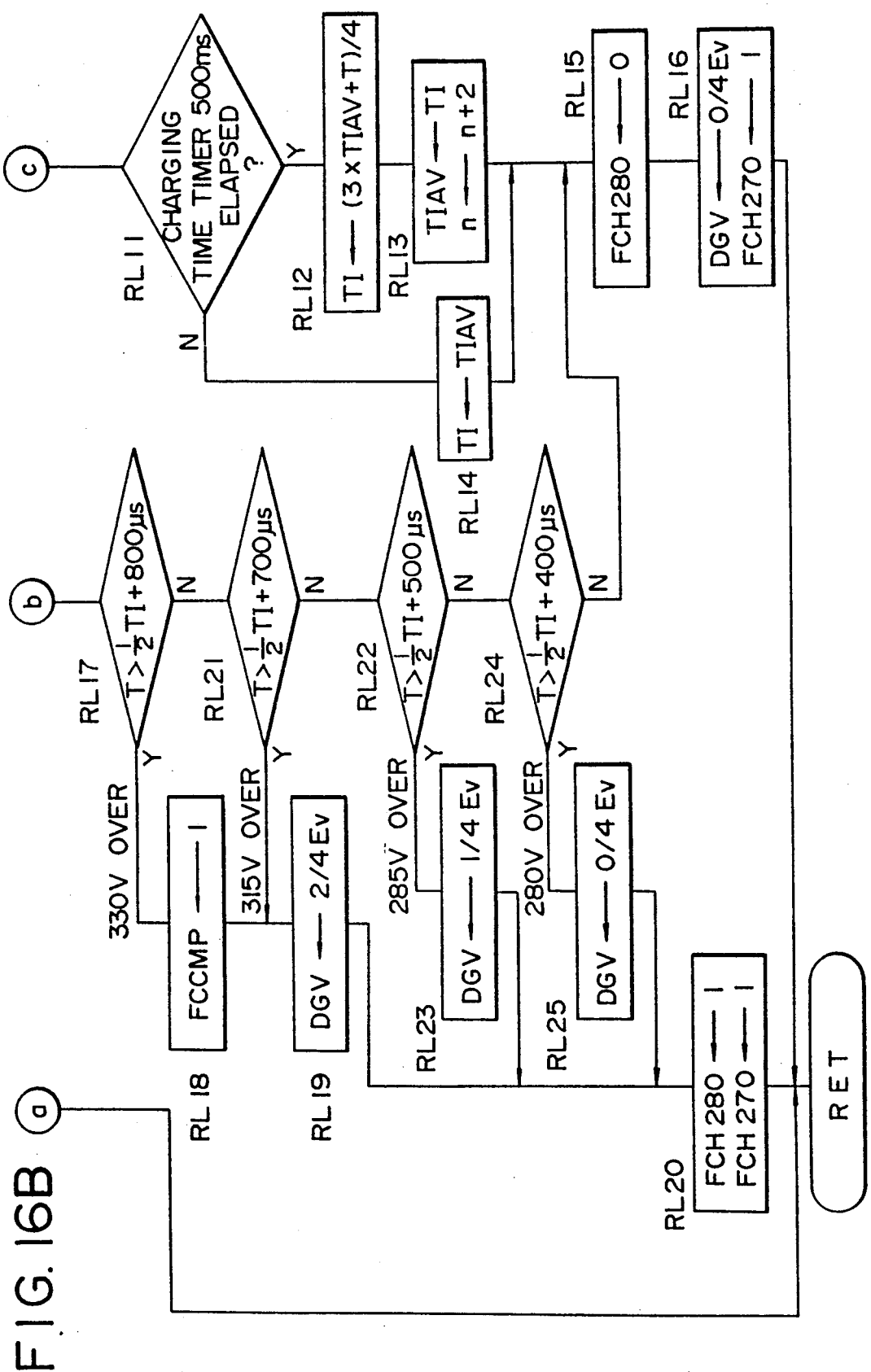

FIG. 16 shows the RLS PULSE TIME MEASUREMENT subroutine called in step CC16 of the CHARGE CONTROL subroutine. This subroutine is executed to detect the voltage of the strobe main capacitor as the pulse time obtained by voltage−time conversion.

In steps RL1 through RL4, the voltage check signal is set to L, and it is checked whether the RLS becomes L before a 2 ms timer times up.

As described above, the RLS becomes L only when the charged voltage exceeds 270 V and thereby the Ne lamp turns ON. Therefore, the charged voltage is descriminated 270 V or less, if the RLS remains H for 2 ms, and a charged voltage 270 V flag and a charged voltage 280 V flag are both cleared, i.e., set to 0, in step RL5, and then a DGV is set to 0/4 to return to the MAIN operation.

The strobe capacitor is fully charged at 330 V, and the guide number is determined based upon light quantity of flashing at this full-charge voltage. In this embodiment, however, even if the strobe capacitor is not fully charged, the strobe is prepared to flash corresponding to the charged voltage. Accordingly, the guide number must be corrected in accordance with the charged voltage to obtain proper exposure. DGV is a parameter which represents the correcting amount of the guide number corresponding to the charged voltage. The parameter is set to 2/4 at 315 V or more, ¼ at 285 V to 315 V, and 0/4 at 285 V or less.

In case the RLS becomes L before the 2 ms timer times up, i.e., in case the charged voltage exceeds 270 V, the time elapsed until the RLS becomes H, is measured by the RLS pulse time timer to set the pulse time T, in steps RL7 through RL9.

When the charged voltage exceeds 270 V and the RLS pulse appears for the first time after charging has started, steps RL11 through RL14 are executed once to correct the measurement reference time T1 according to the measured RLS pulse time T. In case 500 ms has elapsed after charging has started, T1 is determined based upon the average value T1AV of past T1 stored in the RAM. Then, T1 which is newly determined is set as the new average value T1AV, and 2 is added to the prohibiting time data n.

When the RLS becomes L before 500 ms elapses since the charging time timer starts, assumed is that the capacitor was already charged at 270 V or more before charging started, and the value of T1AV is set as T1 without correcting T1. Further, in this case, it is assumed that the charging time is short and the temperature rise in the transformer is small. Accordingly, no value is added to the prohibiting time data n.

The charged voltage VF and the RLS pulse time have a relation as shown in FIG. 7 for the design. However, the value may deviate product by product. So, by averaging the values of the first RLS pulses which substantially correspond to the charged voltage 270 V at every charging time and by considering it in evaluating the pulse time, the above deviations in the products are corrected.

In steps RL15 and RL16, the charging voltage 280 V flag FCH280 is cleared, DGV is set to 0/4 Ev and the charging voltage 270 V flag FCH270 is set to 1.

In the RLS PULSE TIME MEASUREMENT subroutine executed at second time or later after the charged voltage exceeds 270 V, in steps RL17 through RL25, the latest RLS pulse time T is compared with a voltage corresponding time to descriminate the charged voltage.

The voltage corresponding time is designed to be 330 V at $T1/2 + 800$ μs; 285 V at $T1/2 + 500$ μs; and 280 V at $T1/2 + 400$ μs. FIG. 7 shows an example where T1 is 600 μs.

If the voltage exceeds 330 V, the charge completion flag FCCMP is set to 1 and DGV is set according to the voltage. If the charged voltage exceeds 280 V, the charged voltage flags are all set to 1 and then the processing returns to the MAIN operation.

If the voltage is 280 V or less, the processing returns to the MAIN operation via steps RL15 and RL16.

TIME OUT CHECK subroutine

Figure 17:
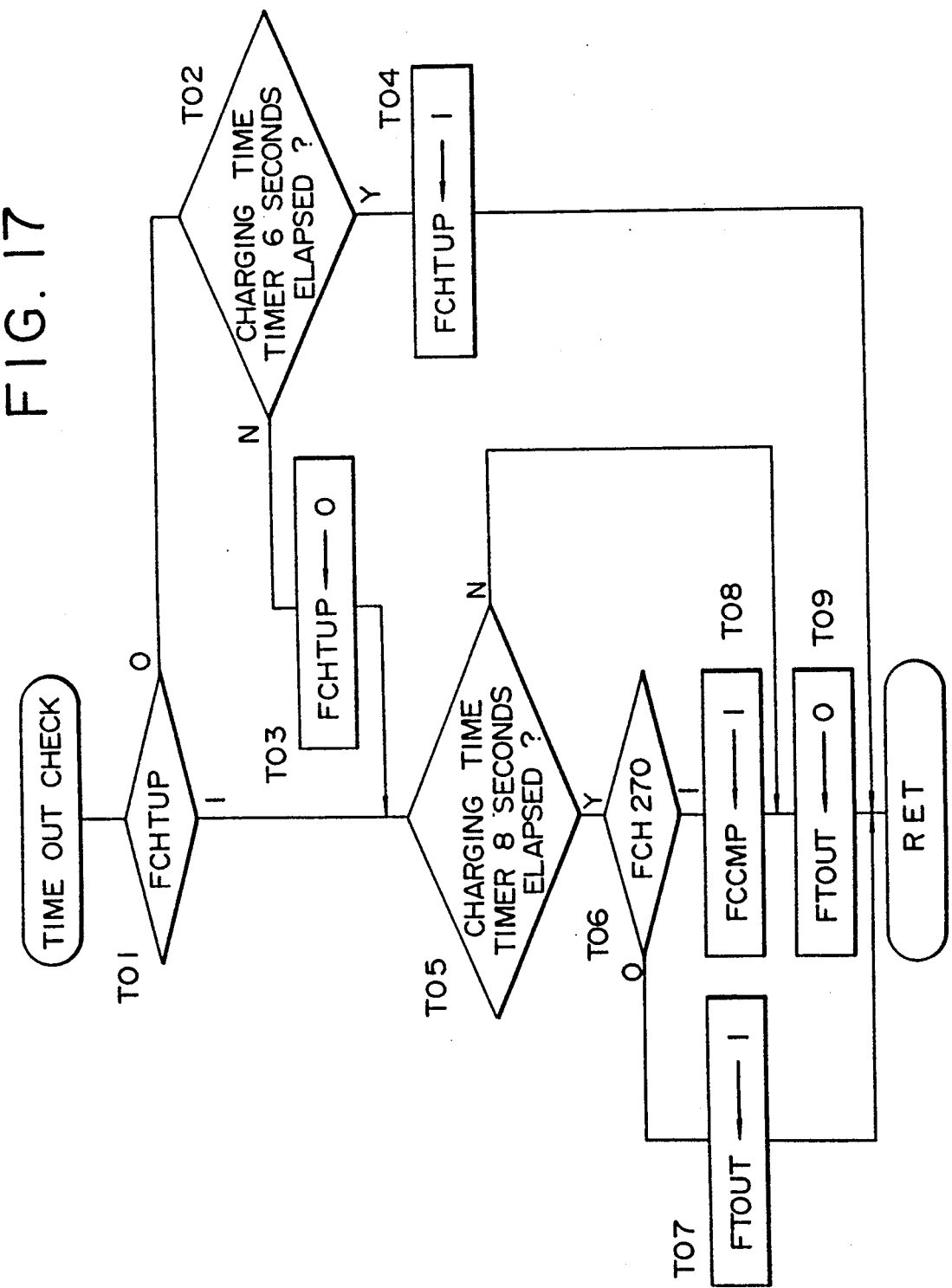

FIG. 17 shows the TIME OUT CHECK subroutine executed in step CC17 of the CHARGE CONTROL subroutine. This subroutine is executed to determine the upper limit of the charging time according to the counted time of the charging time timer which is started in step CC12 of the CHARGE CONTROL subroutine.

This subroutine comprises steps TO1 through TO9. If charging is being executed after the charging time timer counts 6 seconds, the time up flag FCHTUP is set to 1.

When 8 seconds elapse, if the charging voltage reaches 270 V, the charge completion flag FCCMP is set to 1. Otherwise, the time out flag FTOUT is set to 1 and the processing returns to the MAIN operation. When the time out flag is set to 1, charging is stopped in the CHARGE CONTROL subroutine.

CHARGE PROHIBIT TIME subroutine

FIG. 18 shows the CHARGE PROHIBITION TIME subroutine executed in step MI73 of the MAIN operation and in a LOCK operation described later. This subroutine serves to decrement the prohibiting time data n being set, if the strobe is not used. With this subroutine, the prohibiting time TW is shortened.

If it is indicated by a prohibiting time reduction prohibit flag FCNTSTP that the reduction of the prohibiting time is not allowed namely, when the charge prohibiting time is being counted or in case charge prohibiting time is already set to be 0 the processing returns to the MAIN operation from step TC1 without executing any step.

When the reduction is not prohibited, the flag FCNTSTP is cleared. If the prohibiting time data n is 0, in step TC5, the prohibiting time reduction prohibiting flag FCNTSTP is set to 1 and then the processing returns to the MAIN OPERATION. From the next call, the decrement in n is not executed.

If the prohibiting time data n is not 0, in steps TC6 through TC12, the 4 sec. timer is used and n is decremented by 1 for every 4 seconds, of elapsed time.

In other words, the prohibiting time data n is not decremented only when n becomes 0.

LOCK operation

Figure 19B:
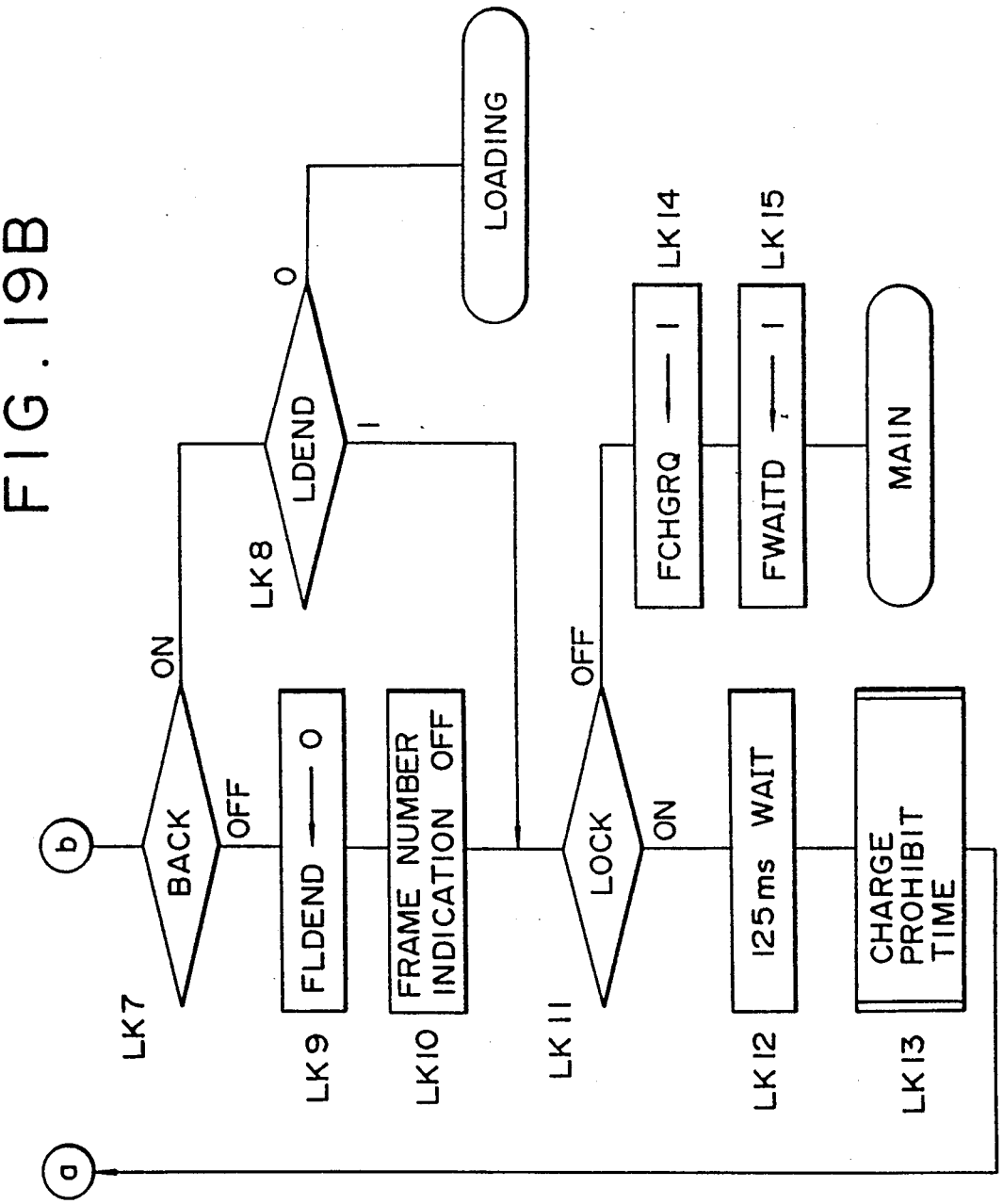

FIG. 19 shows the flow of the LOCK operation that diverges from step MI24 of the MAIN operation. This operation is executed when the photographing lens is stored in the lock position after the lock switch is turned ON.

When this operation starts, the frame number indication on the LCD indication is display turned ON or OFF according to the state of a loading end flag FLDEND in steps LK1 through LK4 to set the initial mode.

The loop of steps LK5 through LK13 is repeated in 125 ms intervals on conditions that the rewind switch REW is OFF, the back cover switch BACK is OFF or the loading is finished even if the back cover switch BACK is ON, and the lock switch LOCK is ON.

In step LK13, the CHARGE PROHIBIT TIME subroutine is executed like step MI73 of the MAIN operation.

In case the rewind switch is turned ON, the processing diverges from LK6 to a REWIND operation.

In case the back cover is closed and loading is completed, steps LK9 and LK10 are skipped to form the loop. When the back cover is open, the loading end flag is cleared and the frame number indication is turned OFF. In next looping, when the back cover is closed, the processing diverges from step LK8 to a LOADING operation.

In case the lock switch LOCK is set to OFF, the processing sets the charge request flag FCHGRQ and the indication hold flag FWAITD to 1, respectively, in steps LK14 and LK15, then jumps to the MAIN operation.

When the processing returns to the MAIN operation from the LOCK operation, the main capacitor has usually been discharged. Thus, by executing charging request, an operator need not await charge completion if strobe flashing is necessary at a first shutter-release after power is turned ON.

AEAF CONTROL operation

Figure 20A:
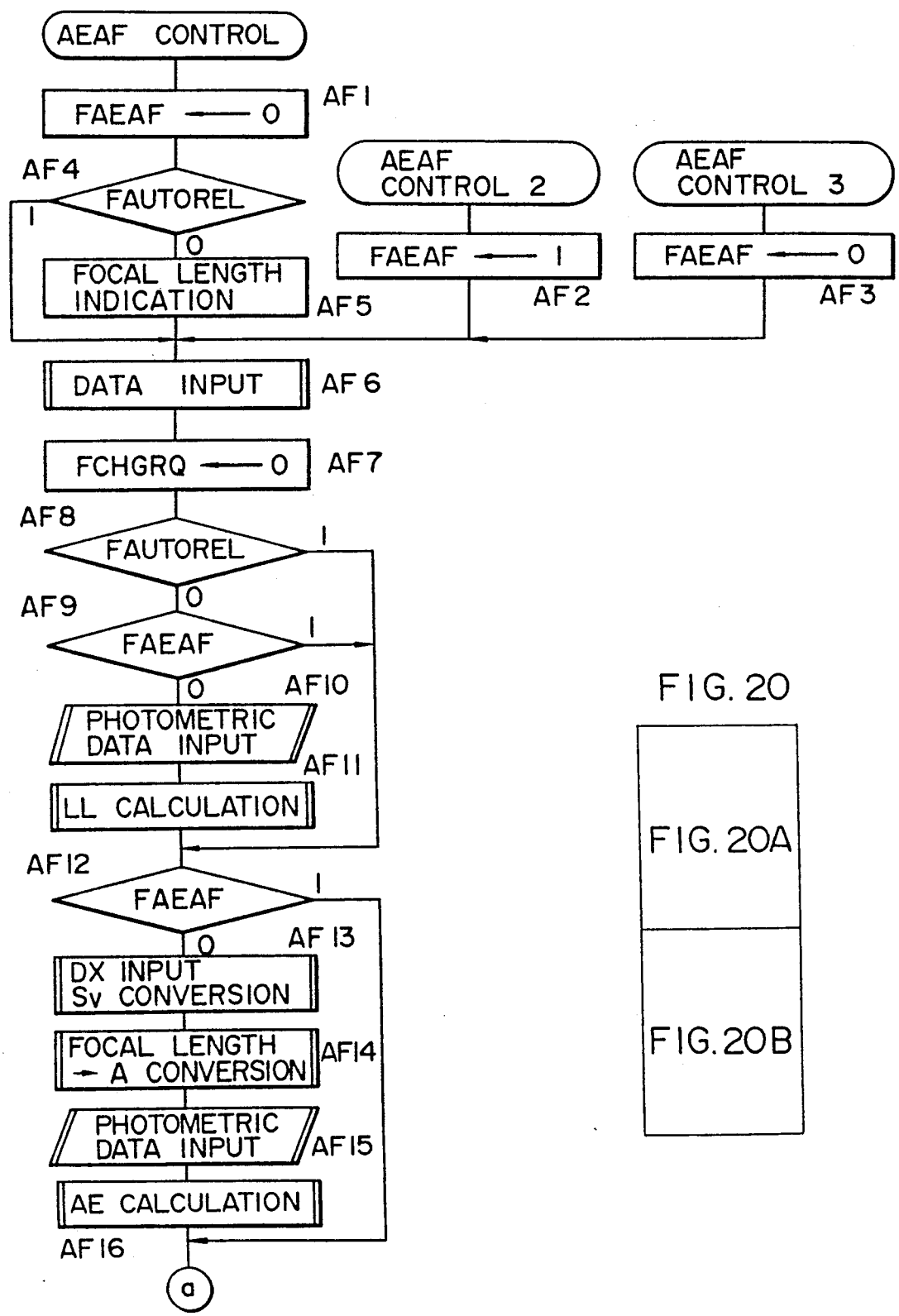
Figure 20B:
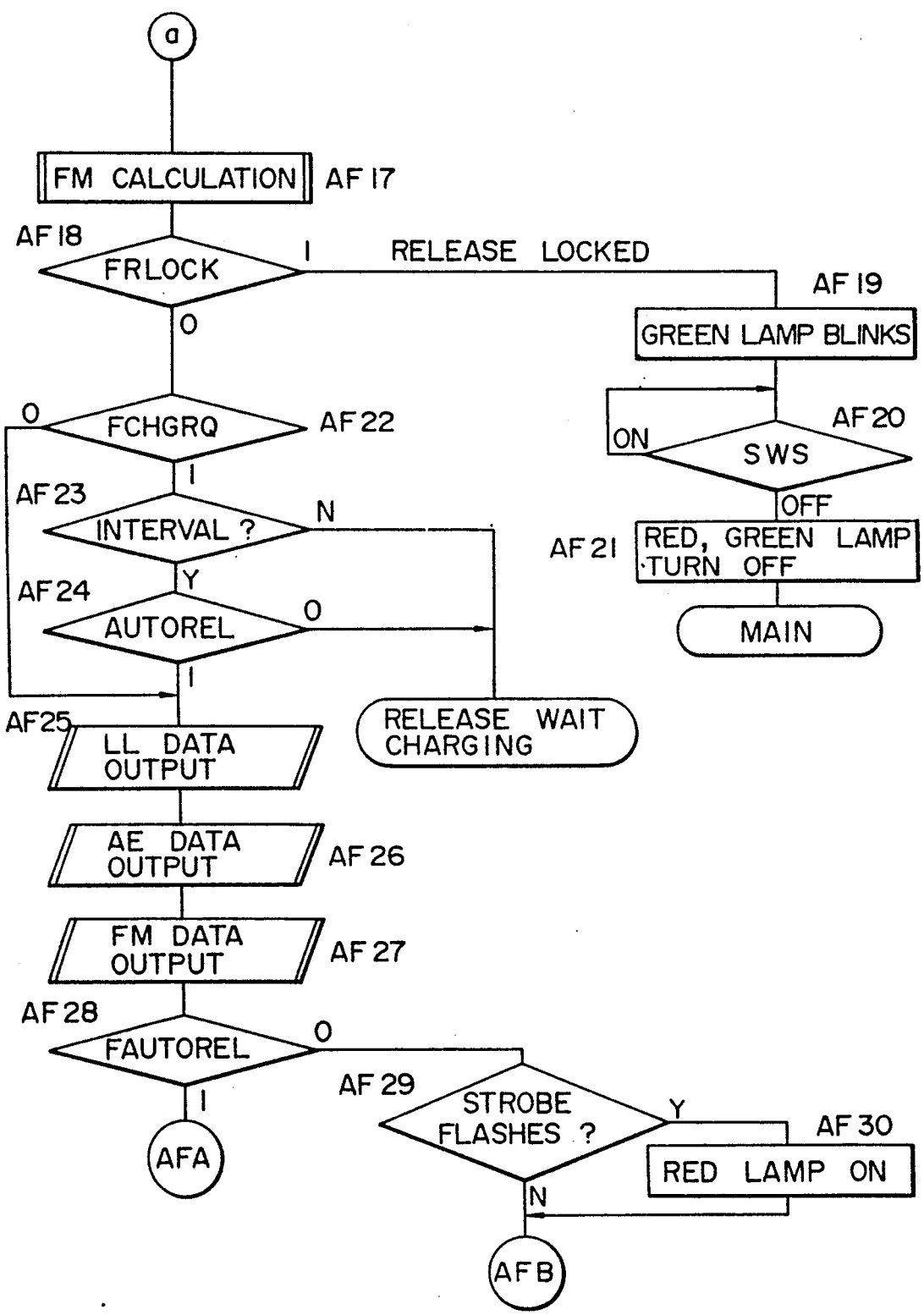
Figure 21B:
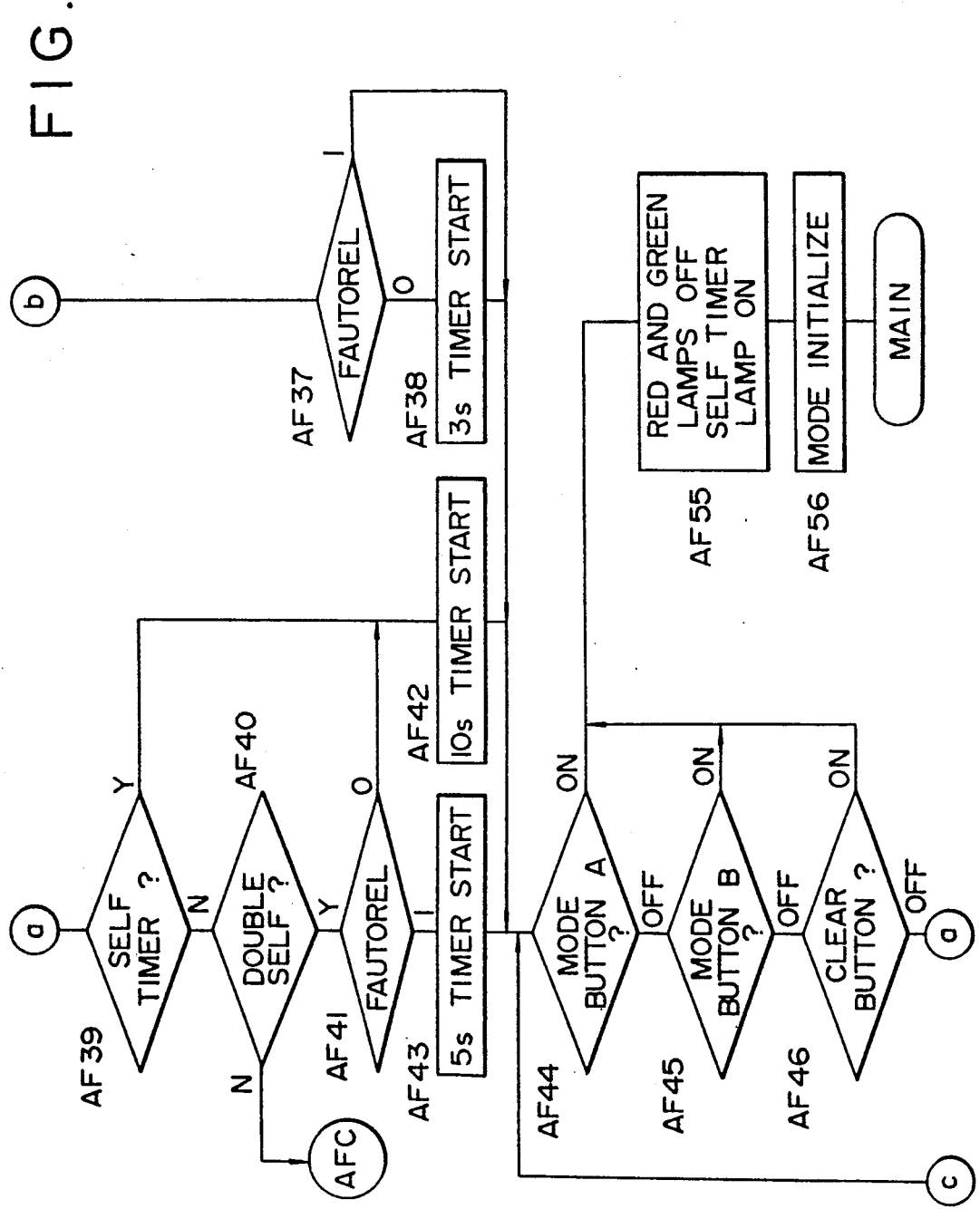
Figure 21C:
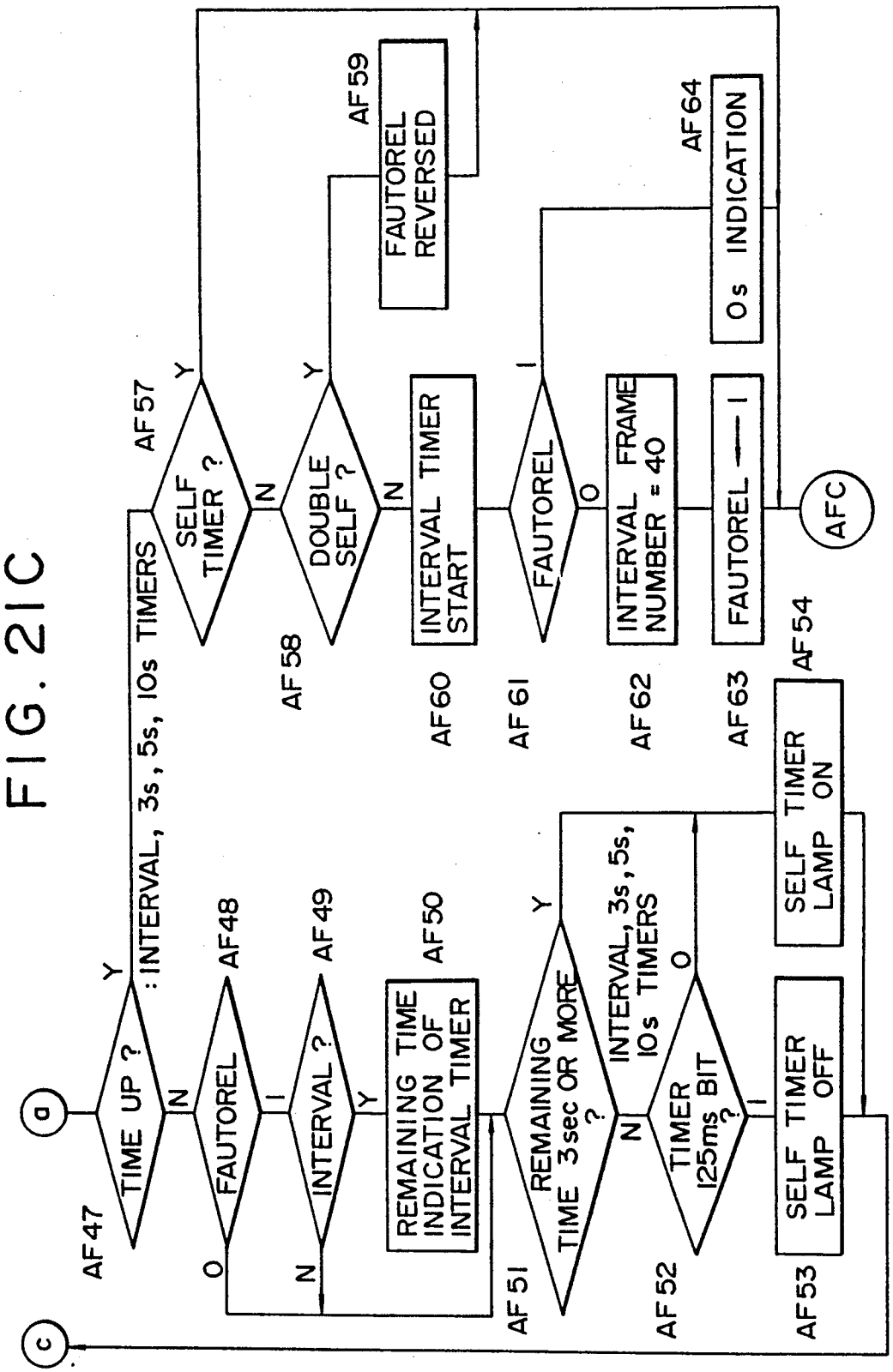
Figure 22B:
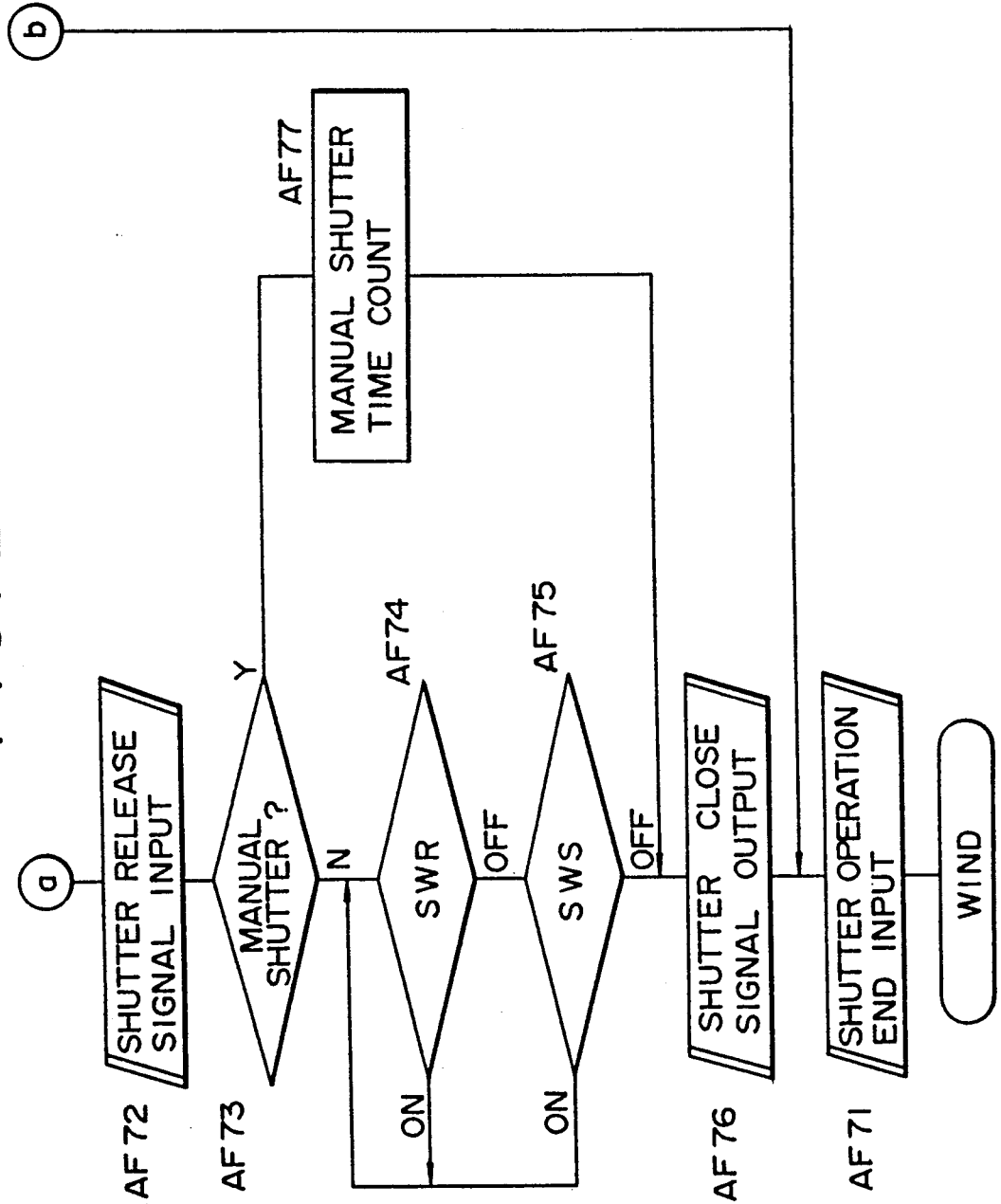

By referring to FIGS. 20 through 22, the AEAF CONTROL operation for controlling the shutter is described, this operation diverges from step MI65 of the MAIN operation.

As described earlier, this operation is executed when the photometry switch SWS is turned from OFF to ON and the mode combination is proper. In addition, after the AEAF CONTROL operation once diverges to the RELEASE WAITING CHARGE operation or after the WIND operation is performed in the continuous photographing mode, the AEAF CONTROL is executed at the AEAF control 2 terminal and at the AEAF control 3 terminal, respectively.

In steps AF1 through AF3, a photometric distance measurement jump flag FAEAF is set depending on from what processing the AEAF CONTROL operation takes place. When the operation is returned from the RELEASE WAIT CHARGE operation diverged in the AEAF CONTROL operation, since the photometric measurement and distance measurement detections have been completed as described later, FAEAF is set to 1 so as to jump such processings. In other cases, the flag FAEAF is set to 0.

When the AEAF CONTROL operation diverges from the MAIN operation, in steps AF4 and AF5, if an auto release flag FAUTOREL is set to 0, the focal length is indicated. This flag is set to 1 in the interval mode or in taking a second shot in the double self mode, as described later. In these cases, even if the photometric switch SWS and the release switch SWR are turned OFF, the photographing is automatically executed.

In step AF6, a VOLTAGE CHECK subroutine described later is executed and the charged voltage of the strobe main capacitor is measured.

In step AF7, the charging request flag FCHGRQ which is set in an FM calculation described later is set to 0.

In steps AF8 through AF11, this operation takes place not from the interval mode or the second shot of the double self mode, but from the MAIN operation or the WIND operation, the photometric data is inputted from sub CPU to execute LL (lens latch) calculation.

In other cases, the former LL data is used. Thus, in performing the interval photographing and the like, the same focus as the first shot takes place. In performing the interval photographing, since the user is normally away from the camera, it is necessary to prevent the focus point from being moved when the subject is moved from the distance measurement area at the center of the screen.

The LL calculation serves to determine the amount of lens movement for focusing the subject according to the result of the distance measurement. In the LL calculation, when the lens is in the zoom area and the subject is at a near distance, the green lamp blink flag is set to 1 so as to generate an alarm to the user and the release lock flag FRLOCK is set to 1. When the lens is in the macro position and the subject is at a far distance, besides the above two flags, the macro tele shift flag FMTIFT is set to 1.

In steps AF12 through AF16, except when the AEAF CONTROL operation takes place again after once diverging to the RELEASE WAIT CHARGE subroutine, the photometric-related processings are executed. That is, in step AF13, DX code is inputted, which is converted into Sv value used to calculate an ISO sensitivity of the film. In step AF14, the compensation amount α (alpha) of the open F number is obtained from the focal length of the lens. With such data and the photometric data being inputted from the sub CPU in step AF15, the AE (automatic exposure) calculation is executed and the AE data is obtained in step AF16.

Figure 24B:
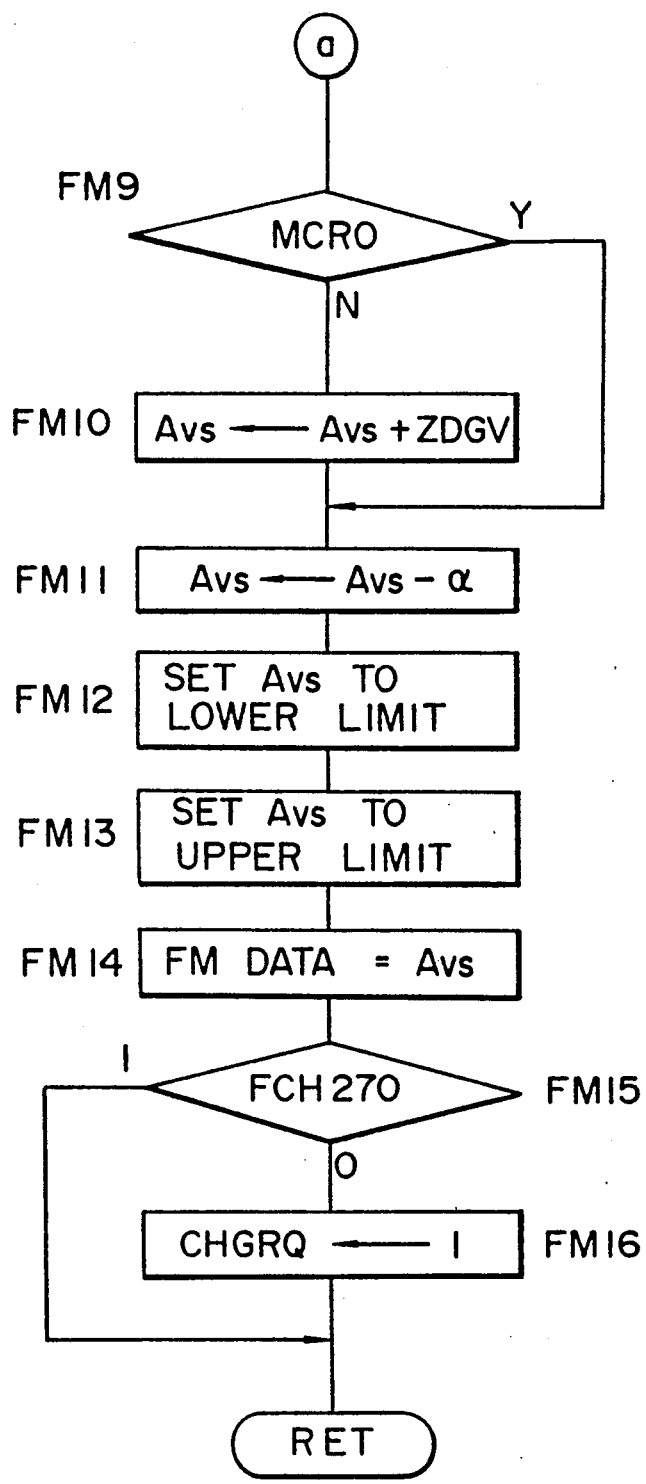

In step AF17, an FM (flashmatic) calculation shown in FIG. 24 is called and the FM data is set. When the AEAF control operation takes place again after the RELEASE WAIT CHARGE operation diverged therefrom, the AE calculation is skipped. However, since DGV may change due to charging, the FM calculation is executed again.

In step AF18, it is checked whether the release lock is descriminated during the LL calculation in step AF11 according to the state of the release lock flag FRLOCK in step AF18. The release lock is discriminated when the lens is in the zoom area and the subject is too close to the lens or when the lens is in the macro position and the subject is too far from the lens. In these cases, since photographs are out of focus, in steps AF19 through AF21, the green lamp blinks to alarm to the user. The processing waits until the photometric switch SWS is released. After that, the processing turn OFF the red and green lamps and then jumps to the MAIN operation.

Figure 25B:
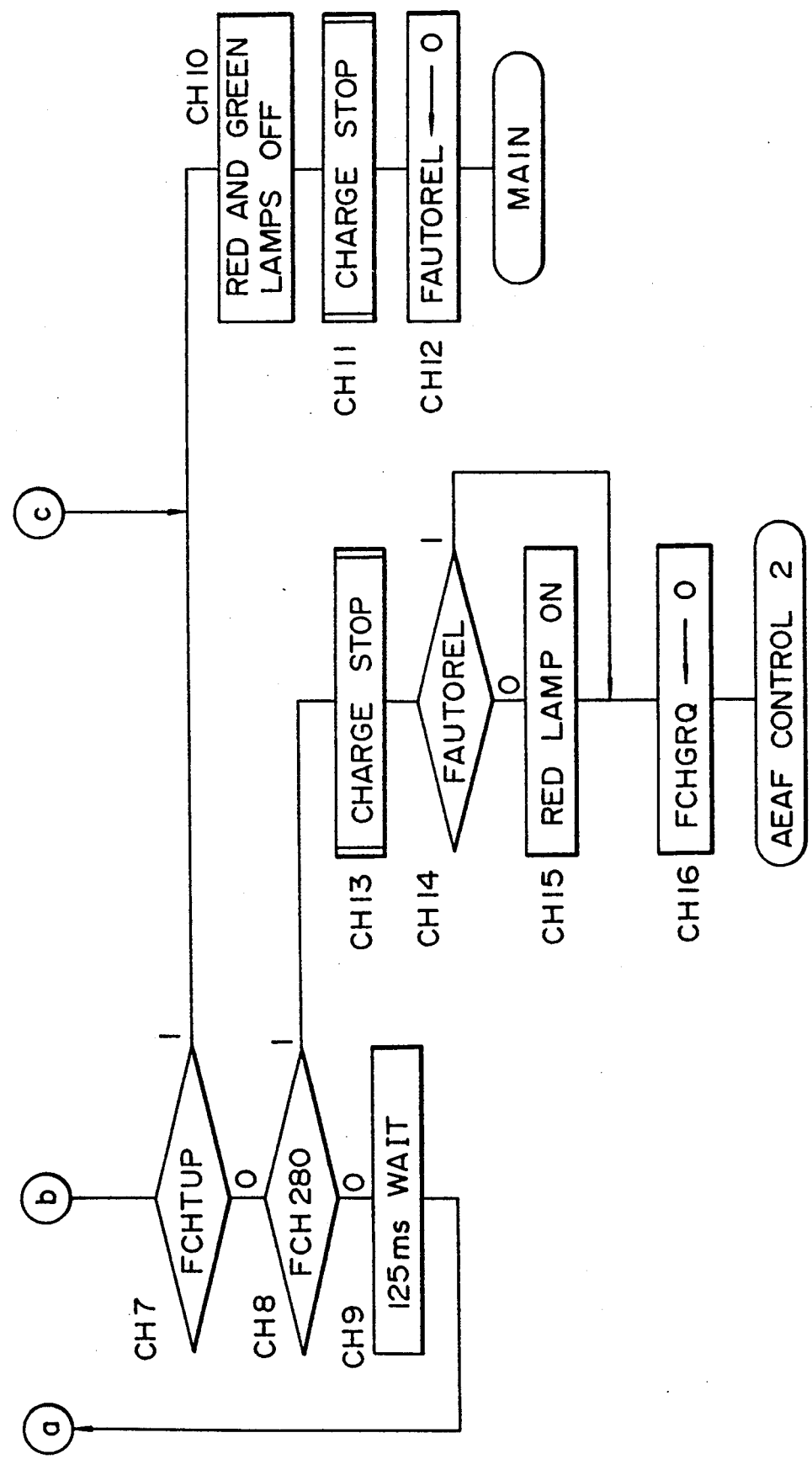

In steps AF22 through AF24, when the charged voltage of the strobe capacitor is lower than a predeermined value and the charging request takes place, in the event that the interval mode does not take place, or in the event that the first shot is photographed in the interval mode, the processing diverges to the RELEASE WAIT CHARGE operation shown in FIG. 25. In other words, in the second or later shots in the interval mode, even if the charged voltage is lower than the predetermined value, the strobe is flashed and the following release sequence is executed.

Figure 27A:
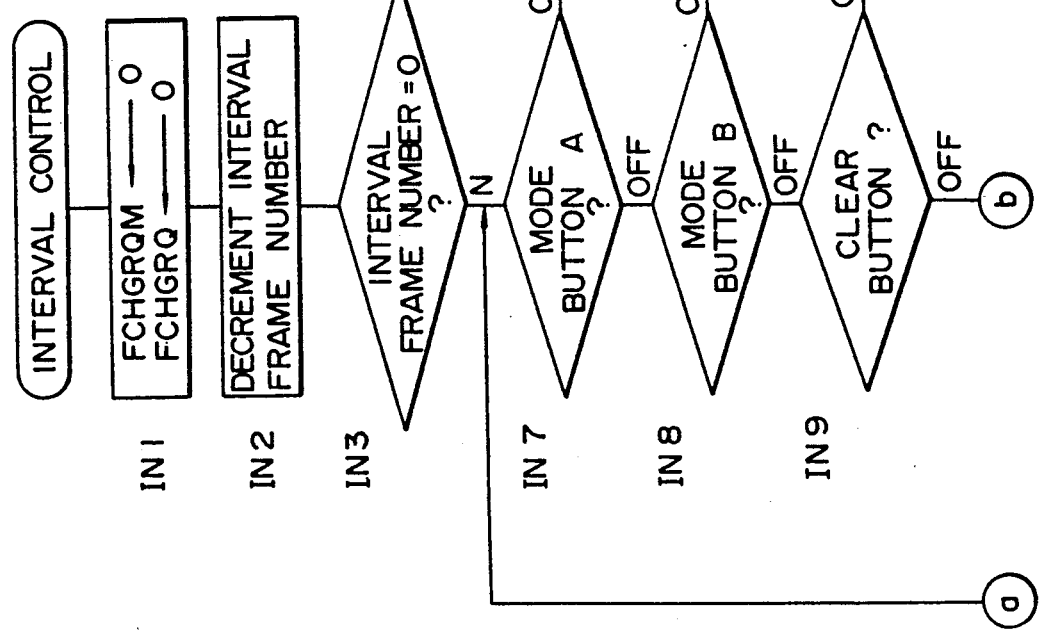
Figure 27C:
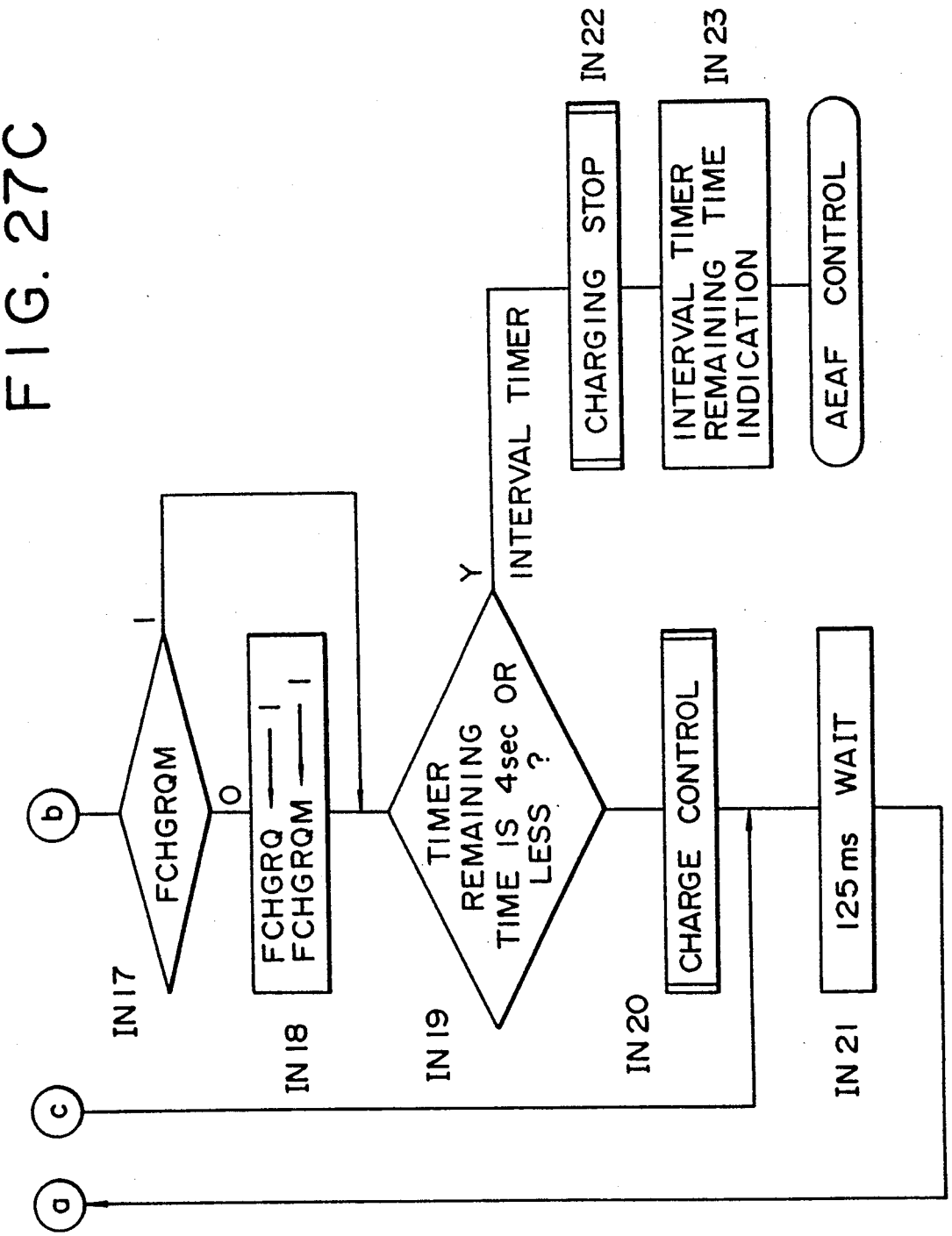

In the interval mode, as shown in FIG. 27, the CHARGING CONTROL operation is executed on every shot. If the charged voltage does not reach the predetermined value with this operation, even when charging is again executed, there is only small possibility of an increase in the voltage.

In steps AF25 through AF27, each data being set is outputted to the sub CPU.

In the automatic photograph mode, the lamp indication, photometric measurement, and judgment of the release switch are skipped and the processing is jumped to AFA shown in FIG. 21. In steps AF29 and AF30, when the strobe is flashed according to FM data, the red lamp is turned ON and the processing is advanced to AFB shown in FIG. 21.

In steps AF31 through AF33, the green lamp is turned ON or blinks according to the green lamp blink flag FGLMPFL which is set in the LL calculation. The turn-on and blinking of the green lamp represent the photograph permission and the alarm, respectively.

In steps AF34 and AF35, when the photometric switch SWS is turned ON, the processing waits until the release switch SWR is turned ON. When the shutter button is released, in step AF34a, the red and green lamps are turned OFF and the processing is jumped to the MAIN operation.

In steps AF36 through AF43, when the first shot is taken in the interval photographing mode, the 3 sec timer is started. When the first shot is taken in the self timer mode or double self timer mode, the 10 sec timer is started. When the second or later shot is taken, since the interval timer has been started, the processing is advanced to a time up wait processing comprising steps AF44 and later. When the mode is in neither the interval mode nor the self mode, the processing is jumped to AFC shown in FIG. 22.

Steps AF44 through AF54 are a loop for waiting until the interval timer, the 10 sec timer, the 5 sec timer, and the 3 sec timer time up. When each timer times up or when the mode button is depressed, the processing exits from this loop. In these cases, in steps AF55 and AF56, the red and green lamps and the self timer lamp are turned OFF, the automatic photographing flag is cleared, the present mode is initialized, and the processing is jumped to the MAIN operation.

At the second or later shot in the interval mode, the remaining time of the interval timer is displayed.

When the remaining time of the interval timer, the 3 sec timer, the 5 sec timer, or the 10 sec timer becomes 3 sec. or less, the self timer lamp is blinks at 4 Hz.

When the timer times up, in the self timer mode, the processing directly advances to AFC shown in FIG. 22. In the double self mode, the processing advances to AFC after the auto release flag FAUTOREL is reversed in step AF59. In the double self mode, at the first shot, the flag is changed form 0 to 1. At the second shot, the flag changed to 0 and the automatic photographing mode is canceled.

In the interval mode, the interval timer is started at the interval time which is set in steps AF60 through AF64. At the first shot, the maximum value of the number of photographing frames is set to 40. In addition, to automatically take the second or later shot, the auto release flag FAUTOREL is set to 1. When the second or later shot is taken, the remaining interval time indication on the LCD display is set to Os and the processing advances to AFC shown in FIG. 22. Step AF64 is executed to prevent the indication from being returned to a value other than 0 because the timer times up.

In steps AF65 through AF67 shown in FIG. 22, before the exposure operation is started, each lamp is turned OFF and the shutter start signal is outputted to the sub CPU. In steps AF68 and AF69, in the overlap photographing mode, date imprinting operation is prohibited.

In other than the bulb mode, the processing diverges from step AF70 to step AF71 where it is confirmed that the shutter operation completion signal is inputted from the sub CPU. After that, the processing advances to the WIND operation shown in FIG. 26.

In the bulb mode, in step AF72, it is confirmed that the shutter release signal is inputted from the sub CPU. In step AF73, it is checked whether the mode is the conventional bulb mode or the manual shutter mode. If it is the bulb mode, in steps AF74 and AF75, the processing waits until the shutter button is released. In step AF76, the shutter close signal is outputted. If it is the manual shutter mode, in step AF77, the manual shutter time is counted and after the counting is completed, the shutter close signal is outputted.

VOLTAGE CHECK subroutine

Figure 23:
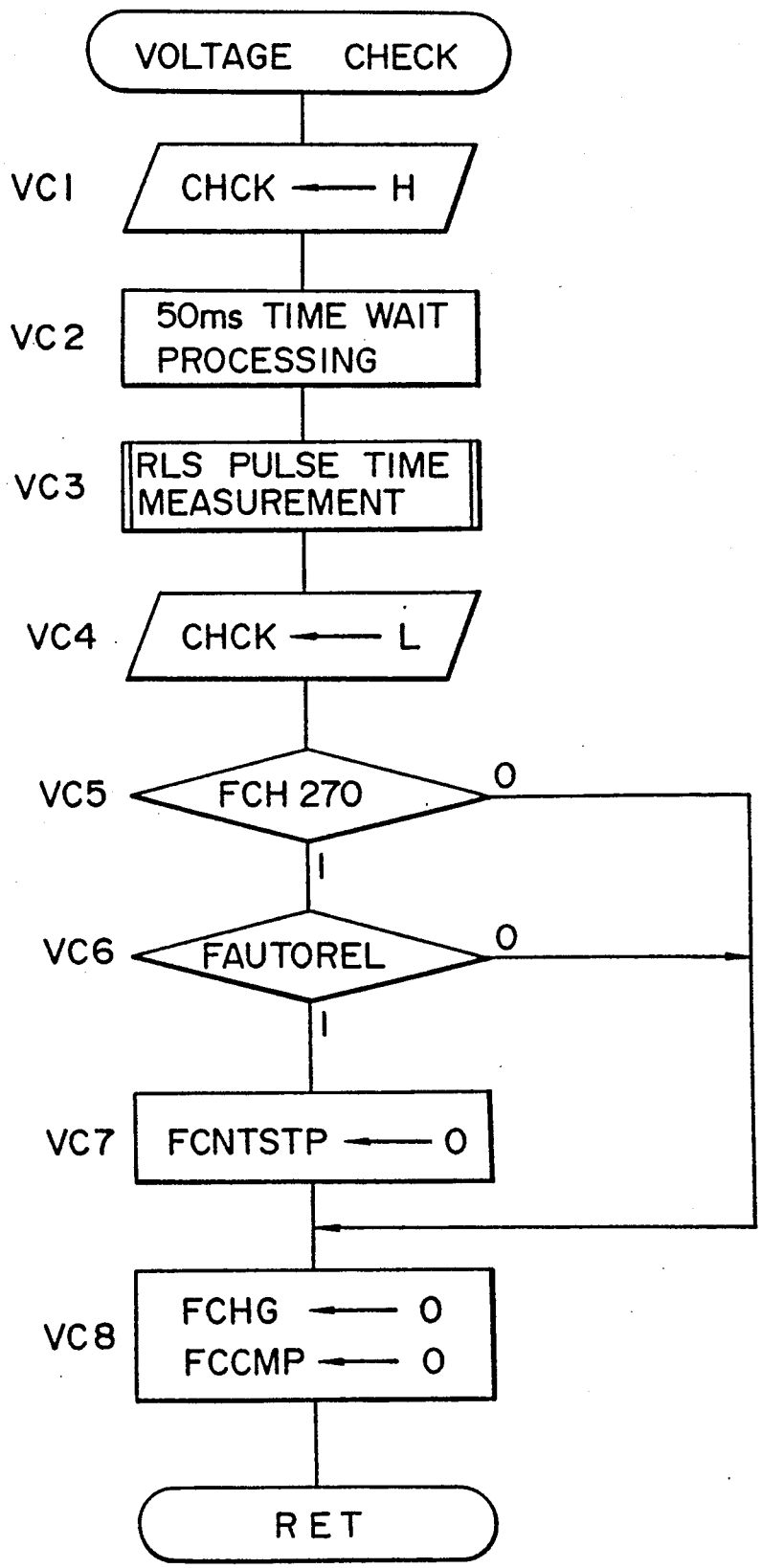

FIG. 23 shows a VOLTAGE CHECK subroutine which is called in step AF6 of the AEAF CONTROL operation.

In steps VC1 through VC4, after the voltage check signal CHCK is set to H, the processing waits for 50 ms so that the Ne lamp turns ON. Then the RLS PULSE TIME MEASUREMENT subroutine described above is executed and the signal CHCK is set to L.

In steps VC5 through VC7, if the charged voltage is 270 V or more, and the camera is operated in the double self mode or the interval mode, the prohibiting time reduction prohibiting flag FCNTSTP is cleared. In other cases, the processing advances to step VC8. Thus, in the double self mode and the interval mode, the prohibiting time is not shortened.

Thereafter, in step VC8, both the charge on flag FCHG and the charge completion flag FCHCMP are cleared, and the processing returns to the AEAF CONTROL operation.

The charge request flag CHGRQ is set to 1, in a later described FM calculation subroutine, by the charged voltage 270 V flag FCHG270 set to 1 in the VOLTAGE CHECK subroutine. Thereby, the processing diverges to the RELEASE WAIT CHARGE subroutine.

FM calculation

FIG. 24 shows the FM calculation called in step AF17 of the AEAF CONTROL operation.

This operation serves to determine whether to flash the strobe and to determine the aperture number Avs at the time when the strobe flashes.

In steps FM1 through FM5, in case of the strobe OFF mode, the exposure compensation mode and the bulb mode, or in case non-flash is determined in the AE calculation in the auto mode, the FM data is set to no-flash and the processing returns to the AEAF CONTROL operation.

In other cases, in step FM6, on aperture value Avs is obtained from the distance measurement data (AF step) and the reference guide number. In step FM7, the charging voltage information DGV is added and the aperture value Avs is corrected. The above guide number is set according to the full charge state of the strobe capacitor. Therefore, unless decrease of the guide number at a low voltage is considered, under exposure takes place.

In step FM8, the film sensitivity Sv is added to the aperture value Avs. In steps FM9 and FM10, in the zoom area, the change amount ZDGV of the guide number caused by zooming of the strobe itself is added.

In step FM11, the change amount α (alpha) of the release F number is subtracted from the aperture value Avs.

In steps FM12 through FM14, the upper and lower limits of the aperture value Avs are restricted. When the voltage of the strobe capacitor is 270 V or less according to the result of the VOLTAGE CHECK subroutine called in step AF6 of the AEAF CONTROL, the charging request flag FCHGRQ is set to 1 and the processing returns to the MAIN operation.

RELEASE WAIT CHARGE operation

FIG. 25 shows the RELEASE WAIT CHARGE operation diverges from steps AF23 and AF24 of the AEAF CONTROL operation.

Steps CH1 through CH9 are a loop for repeatedly executing charging in step CH6 every 125 ms. When it is judged that the charging time completes or the charged voltage exceeds 280 V according to the time up flag FCHTUP and the 280 V charge flag FCH280, the processing exits from the RELEASE WAIT CHARGE operation.

In automatic photographing such as the interval mode, by turning ON one of the mode switches (the mode button A, the mode button B or the clear button C), the processing exits to step CH10. In other than automatic photographing, when user hands off the shutter button 15, the processing exits from the RELEASE WAIT CHARGE operation.

Also, if the charged voltage does not reach to 280 V in 6 seconds and the time is up, the processing exits from the RELEASE WAIT CHARGE operation. When the processing exites from the RELEASE WAIT CHARGE operation, in steps CH10 through CH12, the red and green lamps are turned OFF, the CHARGE STOP operation is executed, automatic photographing is canceled, and the processing jumpes to the MAIN operation.

When the charged voltage reaches 280 V before the time is up, the processing advances to CH14–CH16 via the CHARGE STOP operation in step CH13. In other than automatic photographing, the red lamp is turned ON to inform the user that the strobe is ready to flash. In addition, the charging request flag FCHGRQ is cleared and the processing jumpes to the AEAF control 2 shown in FIG. 20. When the processing advances from the RELEASE WAIT CHARGE operation to the AEAF CONTROL operation, the photometric measurement operation, the distance measurement operation and so forth are omitted and the calculation is executed using the former data. During charging, the voltage is checked in comparison to 280 V. After charging, the voltage is checked in comparison to 270 V, because the voltage drop and noise due to the charge stop are to be considered.

In the CHARGE CONTROL subroutine executed in the MAIN operation, charging is completed when the charged voltage reaches 330 V and the time up in 8 sec. is monitored. However, in the RELEASE WAIT CHARGE operation, since the user waits until charging is completed while pressing the photometric switch SWS, charging is completed when the voltage reaches 280 V and the time is monitored for 6 sec. Thus, since the charging request flag FCHGRQ is not cleared in step CC10 of the CHARGE CONTROL subroutine, the flag is cleared in step CH16.

WIND OPERATION

Figure 26A:
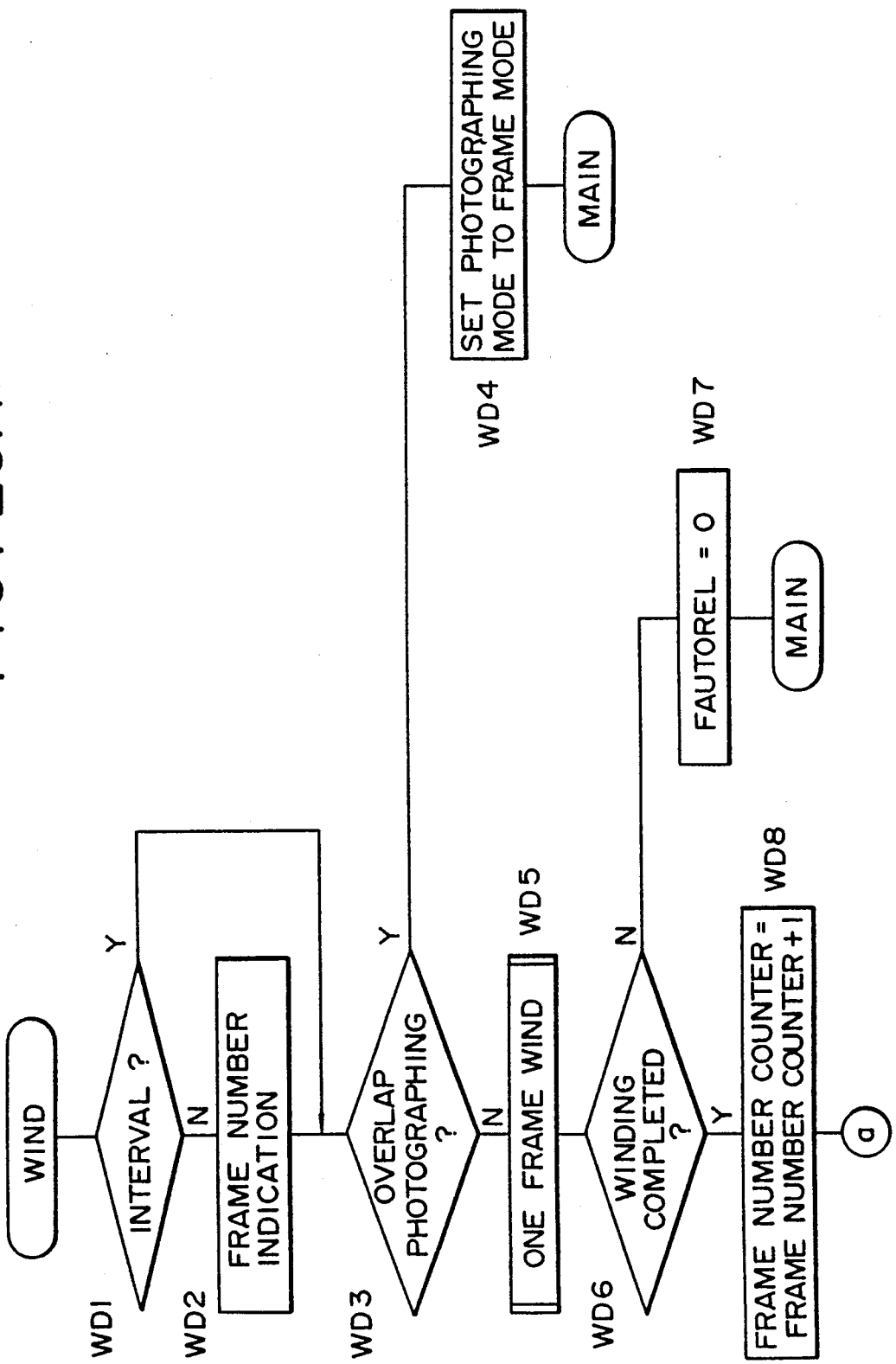

FIG. 26 shows the WIND operation which is advanced after the AEAF CONTROL is completed.

The WIND operation serves to wind one frame of the film whenever photographing takes place.

In the WIND operation, in steps WD1 and WD2, the frame number is indicated on the LCD display except in the interval mode. In the overlap photographing mode, the processing branches from step WD3 to step WD4 to return to the frame photographing mode, and the processing jumps to the MAIN operation. In other words, the overlap photographing mode is cleared whenever one frame is photographed.

In other than the overlap photographing mode, in step WD5, one frame is wound. When the WIND operation is not completed in a predetermined time, the processing branches from step WD6 to step WD7 where the automatic photographing operation flag is cleared and the processing executes the REWIND operation and jumps to the MAIN operation.

When the WIND operation is completed, in step WD8, the frame counter is counted up. In steps WD9 and WD10, if other than the interval mode, the new frame number is indicated. In the interval mode, the frame number is not indicated because the remaining time to next photographing is decrementally indicated as described later.

In steps WD11 through WD15, destination of diverging is determined according to the photographing mode being set.

In the continuous photographing mode, while the shutter button is being depressed, the processing jumps to the AEAF control 3 shown in FIG. 20 and the exposure sequence is continued. When the button is released, the processing jumps to the MAIN operation.

In the double self mode, when the first shot is taken, the processing jumps to the AEAF CONTROL operation. When the second shot is taken, the processing jumps to the MAIN operation.

In the interval mode, the processing jumps to the INTERVAL CONTROL operation shown in FIG. 27. In other modes, i.e., in the frame photographing mode or the self timer mode, the processing jumps to the MAIN operation.

INTERVAL CONTROL operation

FIG. 27 shows the INTERVAL CONTROL operation which diverges from step WD15 of the WIND operation described above. This operation serves to wait while measuring the time for taking second or later shots, when the photographing operation mode is set to the interval mode. In other than the interval mode, this operation is executed in a loop of the MAIN operation. However, in the interval mode, the operation is executed while looping between the AEAF CONTROL operation and the INTERVAL CONTROL operation without returning to the MAIN operation.

In the INTERVAL CONTROL operation, in step IN1, both the charging request flag FCHGRQ and the charging request memory flag FCHGRQM are cleared.

In steps IN2 and IN3, the interval frame count number is decremented and it is checked whether it becomes 0. The initial value of the counting number is 40 frames which is set in step AF62 of the AEAF CONTROL operation. When the 40 frames have been photographed, in steps IN4 through IN6, the CHARGE STOP operation is executed, the automatic photographing flag is cleared, the MODE INITIALIZE subroutine is executed, and the processing jumps to the MAIN operation.

When the frame count number is not 0, steps IN7 through IN21 are looped every 125 ms and the processing waits until the next frame is photographed. During this period, when one of mode switches or the clear switch is turned ON, the mode is initialized and the processing jumps to the MAIN operation.

In this loop, normally the timer decrement indication takes place. (IN13) However, when the photometric switch is turned ON, the frame number is indicated. (IN15) When the zoom tele/wide switch is turned ON, the focal length is indicated. (IN14)

When the remaining time becomes 16 sec or less, in step IN18, both FCHGRQ and FCHGRQM are set to 1. This timer is set and started in step AF60 of the AEAF CONTROL operation.

In the CHARGE CONTROL operation in step IN20, when FCHGRQ is set to 1, charging is executed. (FIG. 14) When the flag is set to 0, charging is skipped.

Thus, in the loop of steps IN17 through IN20, charging is forced to start. When it is judged that the strobe capacitor is fully charged, charging is stopped. In the next loop, the CHARGE CONTROL operation is skipped.

When the remaining time becomes 4 sec. or less, the processing diverges from step IN19. In steps IN22 and IN23, charging is stopped and the remaining time in the timer is indicated. The processing jumps to the AEAF CONTROL operation shown in FIG. 21 and waits until the time is up in steps AF47 and AF54.

As described above, according to the present invention, when the strobe circuit is heated due to frequent chargings, by prohibiting the charging for a predetermined time, it is possible to prevent the circuit from being heated and the circuit parts from being damaged.

In addition, since the charge prohibit time is increased and decreased according to the frequency of strobe flashings, in the event that the circuit is not heated, charging can be immediately executed just after the strobe is flashed, thereby reducing lost time for the user.

Furthermore, the charged voltage of the strobe main capacitor can be detected at a fine level with a relatively simple structure. Thus, exposure control and the like can be accomplished according to the flashing condition corresponding to the charged voltage.

By arranging, that a pulse is output only when the charged voltage exceeds a predetermined reference value, a misjudgment can be reduced in measuring the pulse time.

By arranging that charging time and charge limit voltage can be selected according to the operation mode of the camera, it becomes possible for the user to select the charged voltage or the charge waiting time according to the situation.

By arranging that exposure can be corrected according to a change of the charged voltage, even if the charged voltage of the strobe main capacitor is insufficient, it is possible to prevent under exposure due to weak strobe flashing.

What is claimed is:

1. An apparatus for controlling a strobe which is used with a camera, said apparatus-comprising;
   a charging means for charging the strobe:
   voltage detecting means for detecting the charged voltage of the strobe:
   charging time measuring means for measuring the time elapsed after charging starts;
   charging time-limit selecting means for selecting one of a plurality of charging times according to the operating conditions of the camera;
   charging voltage limit selecting means for selecting one of a plurality of charge limit voltages according to the operating conditions of the camera;
   charging means for stopping charging when the charged voltage does not reach the selected charge limit voltage after the selected charging time has elapsed;
   charging prohibiting means for prohibiting charging if a predetermined charge prohibit time has not elapsed after charging is completed;
   heat discriminating means for discriminating the heat condition of the strobe; and
   prohibiting time changing means for changing said predetermined prohibit time according to the heat condition of the strobe as discriminated by said heat discriminating means.

2. The strobe control apparatus according claim 1, wherein said prohibiting time changing means increments said prohibit time by a first predetermined value whenever the strobe flashes; and wherein said prohibiting time changing means decrements said prohibit time by a second predetermined value whenever a predetermined time elapses.

3. An apparatus for controlling a strobe which is used with a camera, said apparatus, which comprising:
   charge means for charging the strobe;
   voltage detecting means for detecting the charged voltage of the strobe;
   charging time measuring means for measuring the time elapsed after charging starts; and charging time-limit selecting means for selecting one of a plurality of charging times according to the operating conditions of the camera; and charge stopping means for stopping charging when the charged voltage does not reach a predetermined value after the selected charging time has elapsed.

4. An apparatus for controlling a strobe which is used with a camera, said apparatus comprising:

charging means for charging the strobe;

voltage detecting means for detecting the charged voltage of the strobe;

charging time measuring means for measuring the time elapsed after charging starts;

charging voltage limit selecting means for selecting one of a plurality of charge limit voltages according to the operating conditions of the camera; and charge stopping means for stopping charging when the charged voltage does not reach the selected charge limit voltage after a predetermined charging time has elapsed.

5. An apparatus for controlling a strobe which is used with a camera, said apparatus comprising;

charging means for charging the strobe;

voltage detecting means for detecting the charged voltage of the strobe;

charging time measuring means for measuring the time elapsed after charging starts;

charging time-limit selecting means for selecting one of a plurality of charging times according to the operating conditions of the camera;

charging voltage limit selecting means for selecting of a plurality of charge limit voltages according to the operating conditions of the camera; and charge stopping means for stopping charging when the charged voltage does not reach the selected charge limit voltage after the selected charging time has elapsed.

6. An apparatus for controlling a strobe, which comprises;

pulse generating means for generated a pulse, the time width of said pulse corresponds to the charged voltage of the strobe; and voltage detecting means for detecting the charged voltage by measuring the time width of said pulse generated by said pulse generating means.

7. The strobe control apparatus according to claim 6, wherein said pulse generating means generates said pulse only when the charged voltage exceeds a predetermined reference voltage.

8. The strobe control apparatus according to claim 7, wherein said reference voltage is a strobe flash enable voltage.

9. The strobe control apparatus according to claim 6, which further comprises signal output means for outputting a check signal to said pulse generating means comprises:

switch means for switching to a turned ON state when the check signal is outputted from said signal output means, said switch means being switchable between ON and OFF states;

a hysteresis element with a current enable voltage which differs from the current hold voltage of said hysteresis element, the charged voltage of the strobe being applied to said hysteresis element when said switch means is turned ON; and compensation means for compensating for the current flow to said hysteresis element, after said switch means is turned from ON to OFF, during the time while the voltage applied to said hysteresis element drops from the current enable voltage to the current hold voltage, said compensation means generating said pulse corresponding to the time while said compensation means compensates for the current to said hysteresis element.

10. The strobe control apparatus according to claim 9, wherein said hysteresis element comprises a Neon lamp.

11. The strobe control apparatus according to claim 9, wherein said compensation means comprises a capacitor.

12. An apparatus for controlling a strobe, which comprises;

voltage detecting means for detecting the charged voltage of the strobe; and determination means for determining a proper exposure value based upon the voltage detected by said voltage detecting means.

13. An apparatus for controlling a strobe, which comprises:

charging means for charging the strobe;

charge prohibiting means for prohibiting charging if a predetermined charge prohibit time has not elapsed after charging is completed;

heat discriminating means for discriminating the heat condition of the strobe; and prohibit time changing means for changing said predetermined prohibit time according to the heat condition of said strobe descriminated by said heat discriminating means.

14. The strobe control apparatus according to claim 13, wherein said prohibit time changing means extends said prohibit time if said heat discriminating means discriminates that the heat condition of the strobe is over a first predetermined state; and wherein said prohibit time change means shortens said prohibit time if said heat discriminating means discriminates that the heat condition of the strobe is below a second predetermined state.

15. The strobe control apparatus according to claim 13, wherein said heat discriminating means discriminates the heat condition of the strobe based upon the frequency of strobe flashings.

16. The strobe control apparatus according to claim 13, wherein said prohibit time changing means increments said prohibit time by a first predetermined value whenever the strobe flashes; and wherein said prohibit time changing means decrements said prohibit time by a second predetermined value whenever a predetermined time elapses without flashing.

* * * * *

UNITED STATES PATENT AND TRADEMARK OFFICE
CERTIFICATE OF CORRECTION

PATENT NO. : 5,016,038

DATED : May 14, 1991

INVENTOR(S) : T. KOBAYASHI et al.

It is certified that error appears in the above-identified patent and that said Letters Patent is hereby corrected as shown below:

On the title page, under Foreign Application Priority Data, insert
--March 15, 1989 [JP] JAPAN 1-62646

On the title page, under Foreign Application Priority Data, insert
--March 15, 1989 [JP] JAPAN 1-62647--.

At column 20, line 29 (line 2 of claim 1), change "apparatus-comprising" to ---apparatus comprising---.

Signed and Sealed this

Twenty-first Day of June, 1994

Attest:

BRUCE LEHMAN

Attesting Officer     Commissioner of Patents and Trademarks